United States Patent
Teramura

(10) Patent No.: US 8,705,158 B2
(45) Date of Patent: Apr. 22, 2014

(54) SCANNING OPTICAL DEVICE AND IMAGE FORMING APPARATUS USING THE SAME

(75) Inventor: Masayasu Teramura, Utsunomiya (JP)

(73) Assignee: Canon Kabushiki Kaisha (JP)

(*) Notice: Subject to any disclaimer, the term of this patent is extended or adjusted under 35 U.S.C. 154(b) by 346 days.

(21) Appl. No.: 12/579,795

(22) Filed: Oct. 15, 2009

(65) Prior Publication Data
US 2010/0091351 A1 Apr. 15, 2010

(30) Foreign Application Priority Data
Oct. 15, 2008 (JP) .................................. 2008-266281

(51) Int. Cl.
*G02B 26/08* (2006.01)

(52) U.S. Cl.
USPC ...................................................... 359/205.1

(58) Field of Classification Search
USPC .......... 359/198.1–199.4, 200.6–200.8, 202.1, 359/221.2, 223.1–225.1, 226.2, 904, 359/290–295, 838, 846, 871, 872; 250/204, 250/559.06, 559.29, 230, 234; 347/255–260; 353/39, 98–99; 385/15–18; 398/12, 19, 45
See application file for complete search history.

(56) References Cited

U.S. PATENT DOCUMENTS

| | | | |
|---|---|---|---|
| 4,720,632 A | 1/1988 | Kaneko | |
| 4,876,603 A | 10/1989 | Suzuki et al. | |
| 5,841,465 A * | 11/1998 | Fukunaga et al. | 347/258 |
| 5,969,346 A * | 10/1999 | Nagasaka et al. | 250/234 |
| 6,381,428 B1 * | 4/2002 | Yamamoto et al. | 399/116 |
| 6,417,509 B1 | 7/2002 | Atsuumi et al. | |
| 6,678,493 B2 * | 1/2004 | Maeyama et al. | 399/302 |
| 7,319,475 B2 * | 1/2008 | Tomita et al. | 347/243 |
| 7,719,561 B2 * | 5/2010 | Tahk | 347/242 |
| 7,864,208 B2 * | 1/2011 | Lee | 347/256 |
| 8,054,510 B2 * | 11/2011 | Suzuki et al. | 358/461 |
| 2003/0001944 A1 | 1/2003 | Yoshida et al. | |
| 2003/0090563 A1 * | 5/2003 | Tomita et al. | 347/245 |

(Continued)

FOREIGN PATENT DOCUMENTS

| | | |
|---|---|---|
| JP | 3-194569 A | 8/1991 |
| JP | 6-235873 A | 8/1994 |

(Continued)

OTHER PUBLICATIONS

Extended European Search Report issued in corresponding European Patent Application No. 09173029.1 dated Dec. 21, 2009.

(Continued)

*Primary Examiner* — Jennifer L. Doak
(74) *Attorney, Agent, or Firm* — Rossi, Kimms & McDowell LLP

(57) ABSTRACT

A scanning optical device wherein, on the basis of positional information concerning a spacing in a main-scan direction between imaging positions of a plurality of light beams passed through resin-made imaging optical elements and detected by a photodetecting device and a spacing between the imaging positions in a sub-scan direction of the plurality of light beams, a focal shift direction and a focal shift amount in the main-scan direction as well as a focal shift direction and a focal shift amount in the sub-scan direction are determined, and wherein an optical element of an input optical system is moved in an optical axis direction based on the determination, to correct the focal shift in the main-scan direction and the focal shift in the sub-scan direction.

11 Claims, 15 Drawing Sheets

(56) References Cited

U.S. PATENT DOCUMENTS

| | | | |
|---|---|---|---|
| 2004/0090656 A1* | 5/2004 | Yoshida | 359/204 |
| 2005/0093968 A1* | 5/2005 | Iwamoto | 347/238 |
| 2005/0179971 A1* | 8/2005 | Amada et al. | 359/196 |
| 2007/0035799 A1* | 2/2007 | Gomi et al. | 359/214 |
| 2008/0158633 A1* | 7/2008 | Mogi | 359/206 |
| 2010/0091351 A1* | 4/2010 | Teramura | 359/205.1 |

FOREIGN PATENT DOCUMENTS

| | | | |
|---|---|---|---|
| JP | 9-243940 A | 9/1997 | |
| JP | 3480172 B2 | 12/2003 | |
| JP | 2008-26351 A | 7/2008 | |

OTHER PUBLICATIONS

Notification of the First Office Action issued in corresponding Chinese Patent Application No. 200910206350.2 dated Apr. 20, 2011. Full English translation provided.

EP Office Action issued Apr. 4, 2012 for corresponding EP application EP 09173029.1.

* cited by examiner

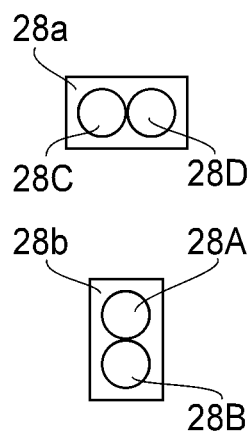 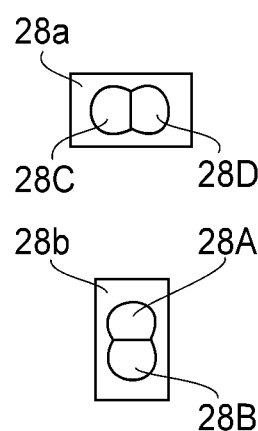 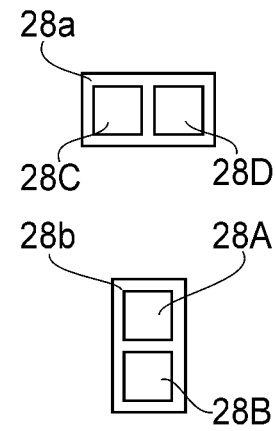
FIG.17A   FIG.17B   FIG.17C
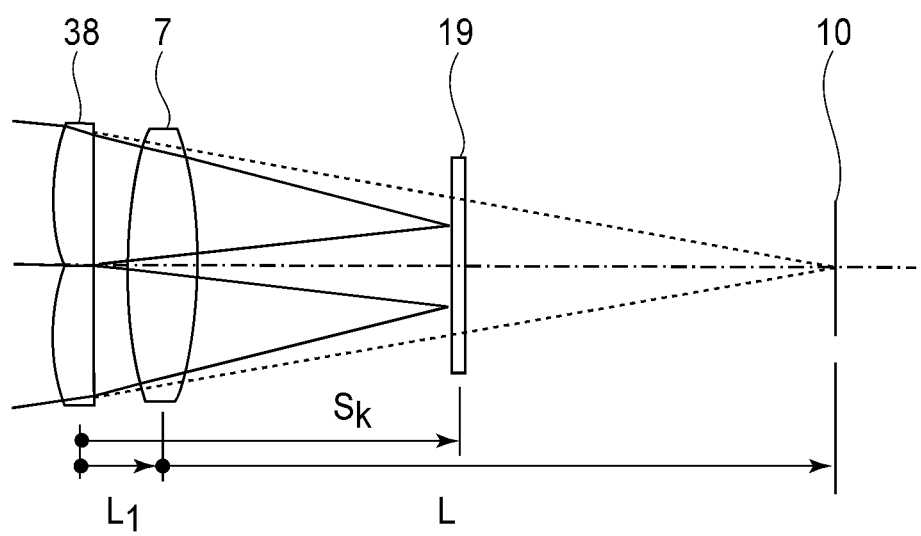
FIG.20

SCANNING OPTICAL DEVICE AND IMAGE FORMING APPARATUS USING THE SAME

FIELD OF THE INVENTION AND RELATED ART

This invention relates to an optical scanning device and an image forming apparatus using the same. The present invention is particularly suitably usable in an image forming apparatus such as a laser beam printer, a digital copying machine or a multifunction printer, for example, having an electrophotographic process.

Conventionally, in scanning optical devices such as those used in a laser beam printer (LBP), for example, a light beam emitted from light source means and optically modulated in accordance with an imagewise signal is deflected periodically by an optical deflector which comprises a rotary polygonal mirror (polygon mirror), for example.

Then, the thus deflected light beam is converged on the surface of a photosensitive recording medium (photosensitive drum) into a spot shape by means of an imaging optical system having a kθ characteristic to be described later, and the optical scanning is carried out on that surface and image recording is performed.

In the following description, the term "main-scan direction" refers to a direction which is perpendicular to a rotational axis (or oscillation axis) of the deflecting means and to the optical axis of the imaging optical system, that is, the direction in which the light beam is reflectively deflected (scanningly deflected) by the deflecting means. The term "sub-scan direction" refers to a direction which is parallel to the rotational axis (or oscillation axis) of the deflecting means. The term "main-scan section" refers to a plane which contains the main-scan direction and the optical axis of the imaging optical system. The term "sub-scan section" refers to a section which contains the optical axis of the imaging optical system and is perpendicular to the main-scan section. The formation of exposure distribution in the sub-scan direction is achieved by moving (rotating) the photosensitive member (which is a member to be scanned) in the sub-scan direction every time the main-scan exposure is carried out.

In recent years, for higher accuracy and further simplification of the scanning optical device, in many cases a resin material is used for imaging optical elements in this scanning optical device.

In an imaging optical element using a resin material such as described above, the surface of a lens or mirror can be easily made aspherical since a resin molding process can be used. Furthermore, if the housing as well for holding the lens or mirror shape is made by using the resin molding process, lightness in weight and simplification can be realized as compared with the conventional method based on metal cutting and casting. Thus, flexible lens disposition is enabled.

A major problem that might be caused by using an optical element made of a resin is that the refractive index or the shape of the material change due to any environmental variation such as a temperature change or absorption of moisture, which in turn leads to a focal shift on the scan surface (the surface to be scanned). If the spot diameter of the light becomes smaller, the depth width decreases in proportion to it. Therefore, even a little focal shift leads to the spot enlargement.

Furthermore, in the main-scan direction and the sub-scan direction, as compared with the depth width of an axial light beam, the depth width of an abaxial light beam will be narrowed $\cos^3 \theta$ times in accordance with the incidence angle θ on the scan surface.

Therefore, in order to obtain a high-definition image, it is necessary to precisely monitor the focus change of the abaxial light in the main-scan direction. Furthermore, if an anamorphic optical system is used, since the focus deviates differently between in the main-scan direction and in the sub-scan direction, it is required to separately detect the focus positions in the main-scan direction and the sub-scan direction.

To this end, it will be convenient to use an autofocus (AF) device which is configured to independently detect the focal shifts in both the main-scan direction and the sub-scan direction and to actively compensate the focal shifts so that a desired spot diameter can be maintained regardless of the environment. Furthermore, detecting the direction and the size of the focal shift at the same time will enable quick control of the focal shift and facilitate higher-speed and higher-precision control.

Conventionally, various scanning optical devices with a focal shift detecting device (focal point detecting device) have been developed (Patent Documents, Nos. 1-3).

Patent Document No. 1 discloses a method of detecting the focal shift using two pieces of knife edges disposed at the image surface and at either before or after the image surface, respectively. Patent Document No. 2 discloses a method of detecting the focal shift using knife edges disposed in the main-scan direction and the sub-scan direction.

Patent Document No. 3 discloses a method wherein the light outside the image forming region (i.e., the light not used for the image formation) is optically divided and the phase difference detection is performed to detect the focal shift.

For detection of the phase difference, an optical element for dividing the light spot after the image surface is used.

In addition to these, there is a focal point detecting device in which, in an image pickup apparatus such as a camera and in order to detect the focal shift on an image surface using light inside the image forming region, means for separating light into plural directions is disposed at a side before the image surface (i.e., the object side) (Patent Document No. 4).

PATENT DOCUMENTS

No. 1: Japanese Laid-Open Patent Application No. 6-235873
No. 2: Japan Patent No. 3480172
No. 3: Japanese Laid-Open Patent Application No. 3-194569
No. 4: Japanese Laid-Open Patent Application No. 2008-26351

In image forming apparatuses using a scanning optical device, in order to form a high-definition image, it is important to very precisely detect the focal shift information including both of the amount of focal shift of the light to be imaged on the scan surface and the focal shift direction.

Furthermore, since scanning optical devices use an anamorphic optical system, it is important to detect the focal shift information at the scan surface, with regard to both of the main-scan direction and the sub-scan direction.

In general, detecting the focal shift information of the light to be imaged on the scan surface by using the light inside the image forming region, namely, the light within the effective scan range, is structurally quite difficult to accomplish since the disposition of a photodetector or a detecting optical system is optically difficult. Furthermore, since the depth width of an abaxial light beam will be narrowed $\cos^3 \theta$ times depending on the incidence angle θ on the scan surface, as compared with the depth width of an axial light beam, it is necessary to perform the detection at a location close as much as possible to the abaxial region.

SUMMARY OF THE INVENTION

In consideration of these, in the scanning optical device, it will be preferable to perform detection of the focal shift information outside the image forming region, and to compensate the focus position at a location near the abaxial area where the depth width becomes narrowest.

The present invention provides a scanning optical device by which, at a location outside the image forming region, the focal shift information of the light to be imaged on the scan surface, with respect to both of the main-scan direction and the sub-scan direction, can be detected independently and by which a high-definition image can be formed.

In accordance with an aspect of the present invention, there is provided a scanning optical device, comprising: light source means; a first optical system configured to collect a light beam emitted from said light source means; deflecting means configured to scanningly deflect the light beam from said first optical system; a second optical system having at leas one imaging optical element made of a resin and configured to image the light beam scanningly deflected by a deflecting surface of said deflecting means onto a surface to be scanned; a third optical system configured to divide a light beam scanningly deflected by the deflecting surface of said deflecting means and passed through an outside of an effective scan region of said second optical system, into a plurality of light beams with respect to each of a main-scan direction and a sub-scan direction; and detecting means configured to detect the plurality of light beams divided by said third optical system in each of the main-scan direction and the sub-scan direction, wherein, on the basis of positional information concerning a spacing in the main-scan direction between imaging positions of a plurality of light beams and a spacing between the imaging positions in the sub-scan direction of the plurality of light beams as detected by said detecting means, a focal shift direction and a focal shift amount in the main-scan direction as well as a focal shift direction and a focal shift amount in the sub-scan direction are determined, and wherein an optical element of said first optical system is moved in an optical axis direction based on the determination, to correct the focal shift in the main-scan direction and the focal shift in the sub-scan direction.

In one preferred form of this aspect of the present invention, said third optical system includes a plurality of optical elements arranged two-dimensionally in relation to each of the main-scan direction and the sub-scan direction, so as to divide the light beam scanningly deflected by the deflecting surface of said deflecting means and passed through the outside of the effective scan region of said second optical system, into a plurality of light beams with respect to each of the main-scan direction and the sub-scan direction.

The third optical system may include (i) a fourth optical system having optical elements arranged one-dimensionally with respect to the main-scan direction and configured to divide the light beam scanningly deflected by the deflecting surface of said deflecting means and passed through the outside of the effective scan region of said second optical system, into a plurality of light beams with respect to the main-scan direction, and (ii) a fifth optical system having optical elements arranged one-dimensionally with respect to the sub-scan direction and configured to divide the light beam scanningly deflected by the deflecting surface of said deflecting means and passed through the outside of the effective scan region of said second optical system, into a plurality of light beams with respect to the sub-scan direction.

When an optical path length from said third optical system to an optical element of said second optical system which element is closest to the surface to be scanned is denoted by $L_1$ (mm), an optical path length from the optical element of said second optical system, closest to the surface to be scanned, up to the surface to be scanned is denoted by L (mm), and an optical path length from said third optical system to said detecting means is denoted by $s_k$ (mm), a relation $L_1 < s_k < L + L_1$ may be satisfied.

When a width of one picture element of said detecting means in one of the main-scan direction and the sub-scan direction is denoted by (mm), and a of a spot of a light beam imaged on said detecting means with respect to a picture element array direction is denoted by D (mm), a relation D≥b may be satisfied, where the width D is the size as sliced by $1/e^2$ of a peak light quantity of a beam intensity distribution.

In accordance with another aspect of the present invention, there is provided an image forming apparatus, comprising: a scanning optical device as recited above; a photosensitive member disposed at a surface to be scanned; a developing device for developing an electrostatic latent image formed on said photosensitive member with a light beam scanningly deflected by said scanning optical device, to produce a toner image; a transferring device for transferring the developed toner image onto a transfer material; and a fixing device for fixing the transferred toner image, on the transfer material.

In accordance with a further aspect of the present invention, there is provided an image forming apparatus, comprising: a scanning optical device as recited above; and a printer controller for converting code data supplied from an outside machine into an imagewise signal and for inputting the imagewise signal into said optical scanning device.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 17A-17C are schematic diagrams each illustrating the shape of pupil dividing means having two lens members.

FIG. 20 is a schematic diagram illustrating the positional relationship of a third optical system in an example wherein pupil dividing means is disposed before an optical element of a second optical system in FIG. 19 which is closest to the scan surface.

DESCRIPTION OF THE PREFERRED EMBODIMENTS

Preferred embodiments of the present invention will now be described with reference to the attached drawings.

Embodiment 1

Figure 1:
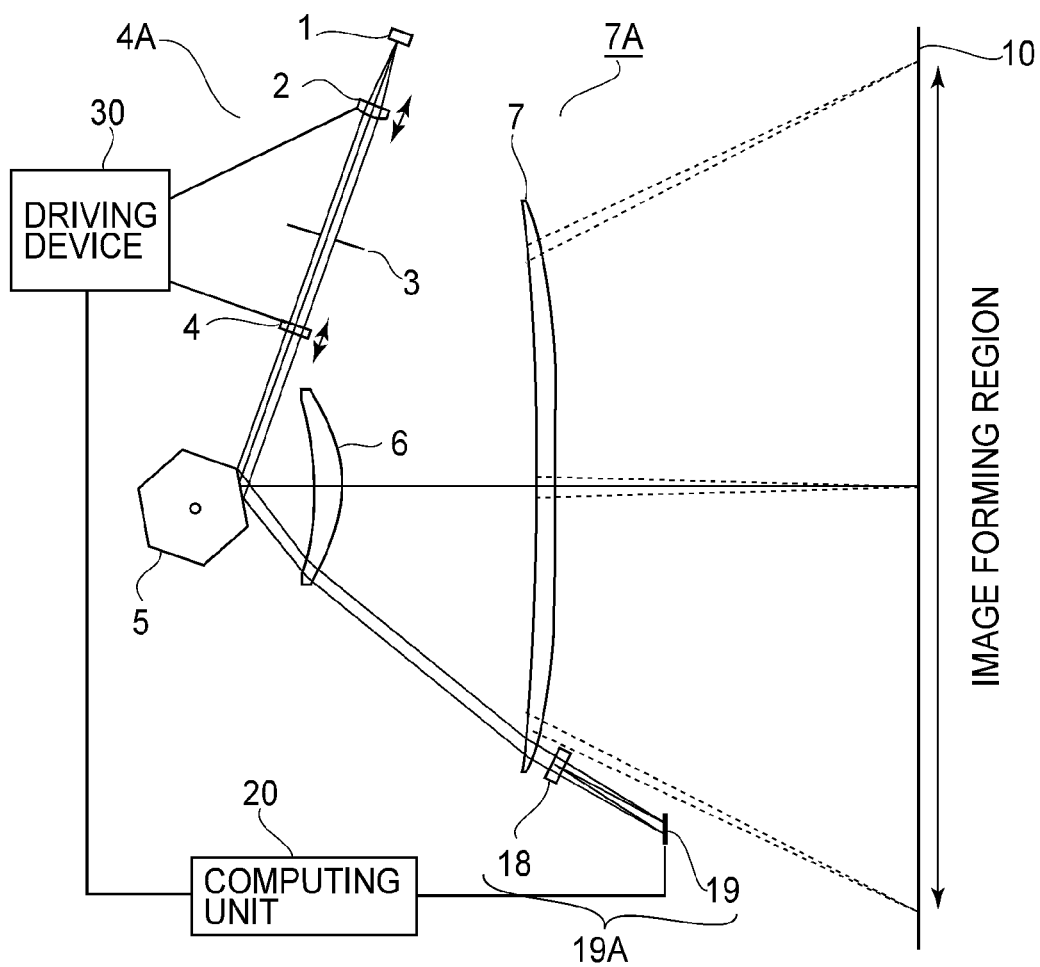
FIG. 1 is a schematic diagram illustrating a first embodiment of the present invention.

FIG. 1 through FIG. 8 are schematic diagrams of a first embodiment of the present invention. Of these drawings, FIG. 1 is a schematic diagram in the main-scan section of the first embodiment of the present invention. FIGS. 2A-2C are schematic diagrams each illustrating the shape of pupil dividing means of FIG. 1.

Figure 3:
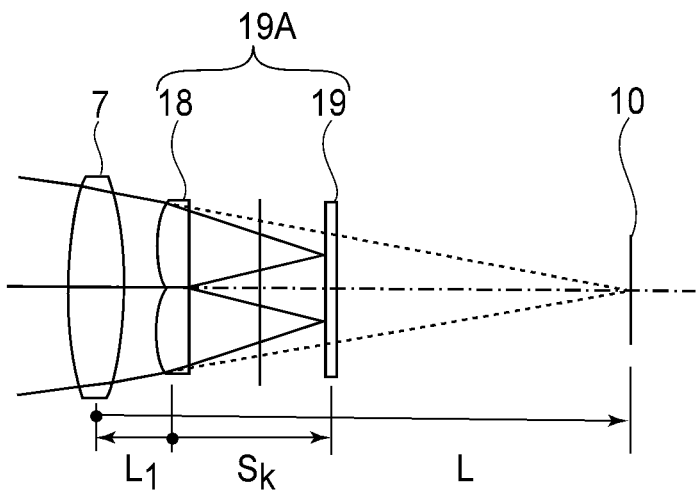
FIG. 3 is a schematic diagram illustrating the positional relationship of a third optical system in an example wherein pupil dividing means is disposed after an optical element of a second optical system which is closest to the scan surface.
Figure 4:
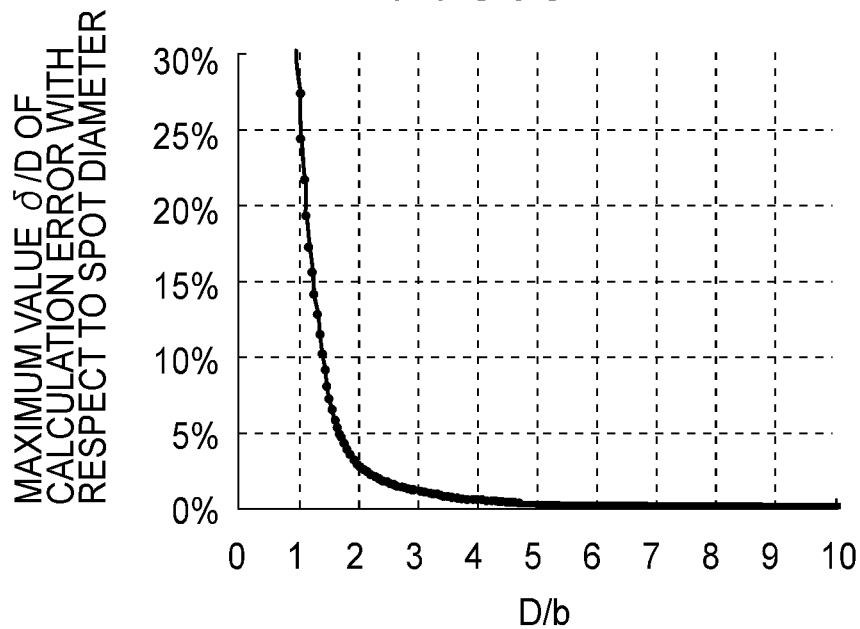
FIG. 4 is a graph showing the relationship of the ratio of a spot diameter to the sensor pitch and a calculation error of the correlation calculation.

FIG. 3 is a schematic diagram illustrating the positional relationship of a third optical system 18 comprised of pupil dividing means which is disposed after an optical element 7 of a second optical system of FIG. 1 which is closest to the scan surface. FIG. 4 is a graph showing the relationship of the ratio of a spot diameter to the sensor pitch and a calculation error of the correlation calculation made by an arithmetic unit 20.

Figure 5:
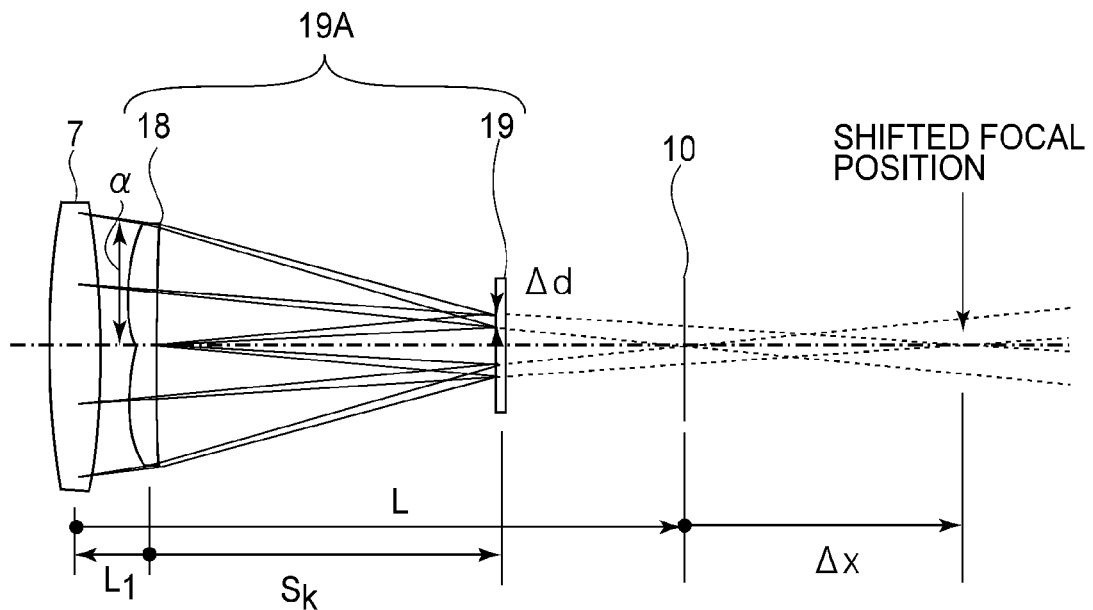
FIG. 5 is a schematic diagram illustrating the light path and parameters in the in-focus state and the focal shift state.
Figure 6:
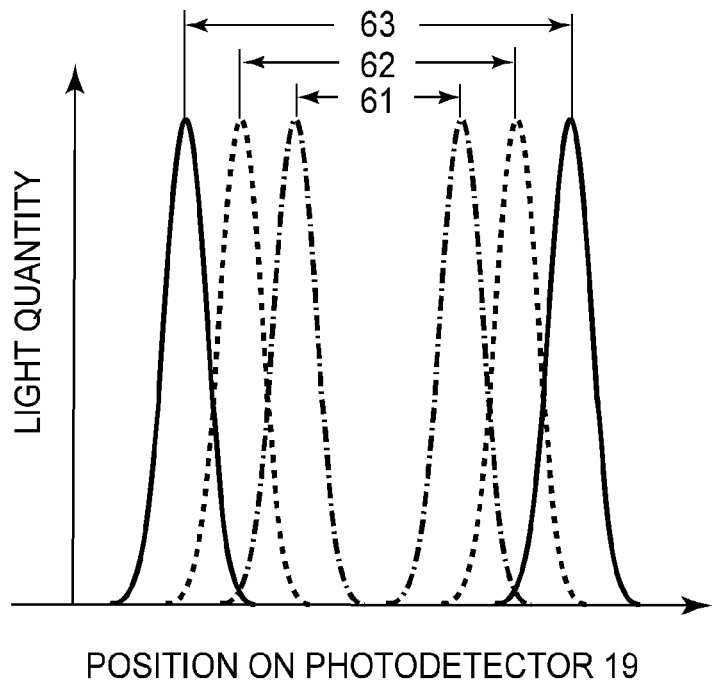
FIG. 6 is a diagram showing signal waveforms at a photodetecting device, in the in-focus state and the focal shift state.

FIG. 5 is a schematic diagram illustrating the light path and parameters in the in-focus state and the focal shift state. FIG. 6 is a diagram showing signal waveforms at a photodetecting device, in the in-focus state and the focal shift state.

Figure 7:
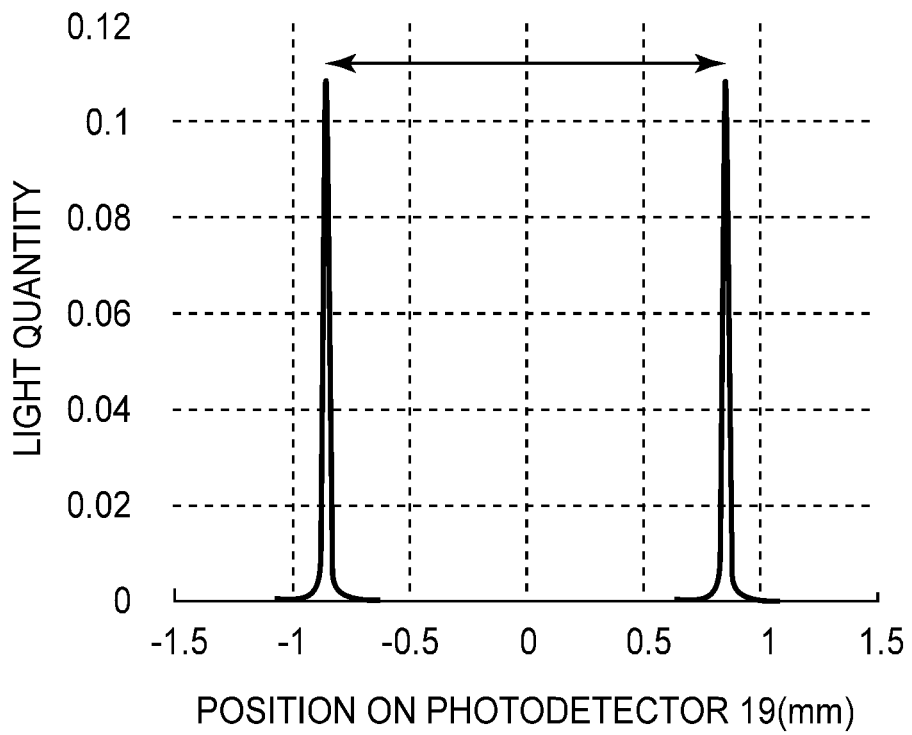
FIG. 7 is a graph illustrating a detection signal in the sub-scan direction.
Figure 8:
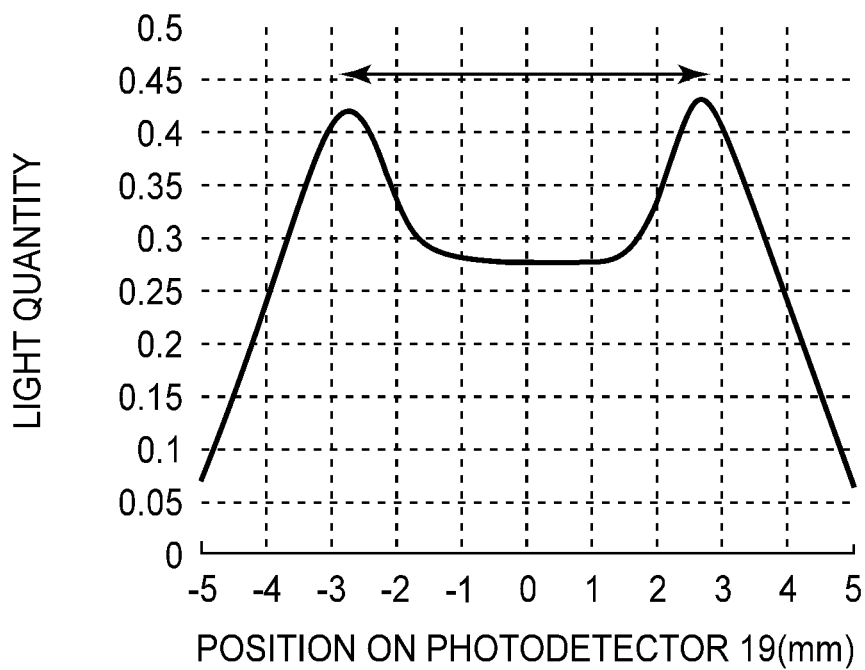
FIG. 8 is a graph illustrating a detection signal in the main-scan direction.

FIG. 7 is a graph illustrating a detection signal in the sub-scan direction. FIG. 8 is a graph illustrating a detection signal in the main-scan direction.

In these drawings, denoted at 1 is light source means which comprises a semiconductor laser, for example. Denoted at 2 is a condenser lens (collimator lens) which serves to convert a light beam emitted from the light source means 1 into an approximately parallel light beam (or a divergent light beam or a convergent light beam).

Denoted at 3 is an aperture stop which functions to shape the light beam from the condenser lens 2 into an optimum beam profile. Denoted at 4 is a cylindrical lens which has a finite power (refracting power) only in the sub-scan direction (sub-scan section).

The condenser lens 2 and the cylindrical lens 4 constitute a portion of a first optical system 4A. Denoted at 5 is an optical deflector (polygon mirror) as deflecting means. It is rotated at a constant speed in a predetermined direction by driving means such as a motor, not shown.

The first optical system 4A functions as an input optical system.

Denoted at 7A is an imaging optical system as a second optical system. It comprises imaging lenses (anamorphic lenses) 6 and 7 made of a resin and having different powers in the main-scan section and the sub-scan section, respectively. Denoted at 18 is pupil dividing means as a third optical system. It comprises four lens members 18A-18D including two (or plural) in the main-scan direction and two (or plural) in the sub-scan direction.

Denoted at 19 is a photodetecting device as detecting means. It is disposed at or near the position where the light beam from the pupil dividing means 18 is imaged. The photodetecting device 19 is comprised of, for example, an area sensor having picture elements arranged two-dimensionally in the main-scan direction and the sub-scan direction.

The light collected onto the photodetecting device 19 is electrically converted, and output data is produced with respect to each picture element. Denoted at 20 is an arithmetic unit which operates to detect, using the result prepared by the photodetecting device 19, the light convergence position (focus position) on the scan surface in accordance with the correlation calculation to be described below. It determines the driving amount for at least one of the condenser lens 2 and the cylindrical lens 4 to shift the light beam from the detected convergence position back to the in-focus position so that the light beam is incident on the scan surface 10 accurately in its in-focus state.

Denoted at 30 is a driving device which drives optical elements such as the condenser lens 2 and the cylindrical lens 4, constituting the first optical system 4A, in the optical axis direction based on the result of the focus information having been calculated by the arithmetic unit 20.

In this embodiment, the light beam emitted from the light source means 1 is converted into a parallel or approximately parallel light beam by the condenser lens 2. Then, the light beam diameter is restricted by a stop 3. Subsequently, the restricted light beam is converted into a convergent light beam in the sub-scan section by means of the cylindrical lens 4. Then, the light beam is collected at or near the deflecting surface of the deflecting means 5.

Subsequently, the light beam scanningly deflected by the deflecting surface of the deflecting means 5 goes through the anamorphic lenses 6 and 7 made of a resin, and it scans the scan surface 10 such as a photosensitive drum at a constant speed.

Table 1 below shows characteristics of the second optical system 7A in the present embodiment.

Here, the point of intersection between each lens surface and the optical axis is taken as a point of origin, and the optical axis direction is taken as an X axis. Furthermore, an axis in the main-scan section which is orthogonal to the optical axis is taken as a Y axis, and an axis in the sub-scan section which is orthogonal to the optical axis is taken as a Z-axis. The aspherical shape in the main-scan section of each lens surface of the resin-made anamorphic lens 6 and the resin-made anamorphic lens 7 can be represented by the following expression.

$$x = \frac{y^2/R}{1 + (1 - (1+k)(y/R)^2)^{1/2}} + \sum_{i=4}^{16} B_i y^i \quad (1)$$

wherein R is the curvature radius of the surface, k is the eccentricity, and Bi (i=4, 6, 8, 10 . . . ) is the aspherical coefficient.

Here, if the coefficient is different between the positive side of Y (upper side in FIG. 1) and the negative side (lower side in FIG. 1), the coefficients at the positive side are expressed with a subscript u, while the coefficients at the negative side are expressed with a subscript l.

Furthermore, the aspherical shape of each lens surface in the sub-scan section of the light entrance surface and the light exit surface of the resin-made anamorphic lens 6 and the light entrance surface of the anamorphic lens 7 is represented by the following expression.

$$S = \frac{z^2/r'}{1 + (1 - (z/r')^2)^{1/2}} \quad (2)$$

Here, S is the sagittal shape which is defined within a plane containing the surface normal to the meridional at an arbitrary position on the meridional and being perpendicular to the main-scan section.

Here, the curvature radius r' in the sub-scan section changes continuously with the Y-coordinate of the lens surface, and it can be represented by the following expression.

$$r' = r\left(1 + \sum_{j=2}^{10} D_j y^j\right) \quad (3)$$

The aspherical shape in the sub-scan section of the light exit surface of the resin-made anamorphic lens 7 is, like the anamorphic lens 6, represented by the following expression.

$$S = \frac{z^2/r'}{1 + (1 - (z/r')^2)^{1/2}} \quad (4)$$

Here, S is the sagittal shape which is defined within a plane containing the surface normal to the meridional at an arbitrary position on the meridional and being perpendicular to the main-scan section.

Here, the curvature radius r' in the sub-scan section changes continuously with the Y-coordinate of the lens surface, and it can be represented by the following expression.

$$\frac{1}{r'} = \frac{1}{r} + \sum_{j=2}^{10} D_j y^j \quad (5)$$

In expressions (2) to (5), r is the curvature radius at the optical axis in the sub-scan section, and Dj (j=2, 4, 6, 8, 10 . . . ) is the coefficient of variation of the curvature radius in the sub-scan section.

Here, if the coefficient is different between the positive side of Y (upper side in FIG. 1) and the negative side (lower side in FIG. 1), the coefficients at the positive side are expressed with a subscript u, while the coefficients at the negative side are expressed with a subscript l.

Furthermore, the surface has a spherical shape in the sub-scan section, changing continuously with the Y-coordinate of the lens surface. It has a shape represented by the tenth-order function of Y.

In Table 1, "E-x" means "$10^{-x}$".

The pupil dividing means 18 is disposed at a position where the scanning light having passed through the first optical system 4A and the second optical system 7A and being out of the image forming region goes through, and also it is disposed after (scan surface side of) the anamorphic lens 6 made of a resin.

The pupil dividing means 18 is comprised of a plurality of lens members which are arranged one dimensionally along at least one of the main-scan direction and the sub-scan direction.

In this embodiment, the pupil dividing means 18 comprises four lens members 18A-18D including two (18C and 18D) in the main-scan direction and two (18A and 18B) in the sub-scan direction.

There is a photodetecting device 19 disposed at or near the imaging position of the light beam from the pupil dividing means 18. The photodetecting device 19 is comprised of, for example, an area sensor having picture elements arranged two-dimensionally in the main-scan direction and the sub-scan direction.

The photodetecting device 19 has a plurality of picture elements arrayed one-dimensionally along at least one of the main-scan direction and the sub-scan direction.

The detection system 19A comprised of the pupil dividing means 18 and the photodetecting device 19 has characteristics such as shown in Table 2.

TABLE 1

STRUCTURE OF SECOND OPTICAL SYSTEM

| F-theta Coeff. Scan Angle & Field Angle | | |
|---|---|---|
| F-theta Coefficient | k (mm/rad) | 200 |
| Scan Angle | W (mm) | 335 |
| Largest Field Angle | theta (deg) | 48 |
| Wavelength & Refractive Index | | |
| Used Wavelength | lambda (mm) | 670 |
| Anamorphic Lens 6 Refractive Index | N1 | 1.5273 |
| Anamorphic Lens 7 Refractive Index | N2 | 1.5273 |

TABLE 1-continued

| STRUCTURE OF SECOND OPTICAL SYSTEM | | |
|---|---|---|
| Scanning Optical System & Disposition | | |
| Polygon Deflection Surface 5a to Lens Exit | d0 (mm) | 26.5 |
| Lens Entrance Surface 6a to Lens Exit Surface 6b | d1 (mm) | 9.6 |
| Lens Exit Surface 6b to Lens Entrance Surface 7a | d2 (mm) | 67.9 |
| Lens Entrance Surface 7a to Lens Exit Surface 7b | d3 (mm) | 5.5 |
| Lens Exit Surface 7b to Scan Surface 10 | d4 (mm) | 126.74 |
| Polygon Deflection Surface 5a to Scan | d total | 236.24 |
| Incidence Angle (Input Optical System) | | |
| Main-Scan Direction Incidence Angle | alpha (deg) | 70 |

| Anamorphic Lens 6 Meridional Shape | | | Anamorphic Lens 6 Sagittal Shape | | |
|---|---|---|---|---|---|
| | Entrance Surface 6a Light Source Side | Exit Surface 6b Light Source Side | | Entrance Surface 6a Light Source Side | Exit Surface 6b Light Source Side |
| R | −7.12389E+01 | −4.14980E+01 | r | −1.00000E+03 | −1.00000E+03 |
| ku | 2.17680E+00 | 6.42947E−02 | D2u | 0 | 0 |
| B4u | 3.69128E−06 | 2.77878E−06 | D4u | 0 | 0 |
| B6u | 8.27275E−11 | 1.17980E−09 | D6u | 0 | 0 |
| B8u | 1.95630E−13 | 2.10270E−13 | D8u | 0 | 0 |
| B10u | 3.54758E−17 | 2.07452E−16 | D10u | 0 | 0 |
| | Remote From Light Source | Remote From Light Source | | Remote From Light Source | Remote From Light Source |
| kl | 2.17680E+00 | 6.42947E−02 | D2l | 0 | 0 |
| B4l | 3.69128E−06 | 2.77878E−06 | D4l | 0 | 0 |
| B6l | 8.27275E−11 | 1.17980E−09 | D6l | 0 | 0 |
| B8l | 1.95630E−13 | 2.17551E−13 | D8l | 0 | 0 |
| B10l | 3.54758−7 | 2.02442E−16 | d10l | 0 | 0 |

| Anamorphic Lens 7 Meridional Shape | | | Anamorphic Lens 7 Sagittal Shape | | |
|---|---|---|---|---|---|
| | Entrance Surface 7a Light Source Side | Exit Surface 7b Light Source Side | | Entrance Surface 7a Light Source Side | Exit Surface 7b Light Source Side |
| R | −8.24438E+02 | 7.68E+02 | r | −1.00000E+02 | −2.36478E+01 |
| ku | 0 | −5.89704E+02 | D2u | 0 | 7.00684E−05 |
| B4u | 0 | −2.57008E−07 | D4u | 0 | −1.56168E−08 |
| B6u | 0 | 2.17131E−11 | D6u | 0 | 2.15646E−12 |
| B8u | 0 | −1.47843E−11 | D8u | 0 | −1.68590E−16 |
| B10u | 0 | 4.78126E−20 | D10u | 0 | 5.61186E−21 |
| | Remote From Light Source | Remote From Light Source | | Remote From Light Source | Remote From Light Source |
| kl | 0 | −5.89704E+02 | D2l | 2.45000E−06 | 1.25282RE−4 |
| B4l | 0 | −2.57008E−07 | D4l | −1.68000E−10 | −1.52826E−08 |
| B6l | 0 | 2.17131E−11 | D6l | 0 | 2.83271E+12 |
| B8l | 0 | −1.47843E−11 | D8l | 0 | −3.04292E−16 |
| B10l | 0 | 4.78126E−20 | d10l | 0 | 1.06411E−20 |

TABLE 2

| WAVELENGTH AND REFRACTIVE INDEX | | |
|---|---|---|
| Used Wavelength | lamda (nm) | 670 |
| Pupil Dividing Means 18 | N1 | 1.5273 |
| Shape of Pupil Dividing Means 18 | | |
| Focal Length | f (mm) | 113.79 |
| Entrance Surface 18a Curvature | ra (mm) | 60.0000 |
| Exit Surface 18b Curvature | rb (mm) | infinite |
| Detection Optical System and Disposition | | |
| Lens Exit Surface 7b to Lens Entrance Surface 18a | d0 (mm) | 10.29 |
| Lens Entrance Surface 18a to Lens Exit Surface 18b | d1 (mm) | 1.00 |
| Lens Exit Surface 18b to Photodetecting Device 19 | d2 (mm) | 64.23 |

Next, the structure of the focal point detecting device (AF detecting unit) of the present embodiment will be explained.

The AF detecting unit is comprised of a detecting system 19A including pupil dividing means 18 and a photodetecting device 19. In this embodiment, the optical element 7 among the second optical system 7A which is closest to the scan surface 10 is an anamorphic lens.

FIG. 3 illustrates the positional relationship, within the main-scan section or the sub-scan section, of the resin-made anamorphic lens 7, pupil dividing means 18, photodetecting device 19 and the scan surface 10.

In FIG. 3, denoted at $L_1$ is the optical path length from the pupil dividing means 18 to the anamorphic lens 7. Denoted at L is the optical path length from the anamorphic lens 7 to the scan surface 10. Denoted at $s_k$ is the optical path length from the pupil dividing means 18 to the photodetecting device 19. If the advancement direction of the light is taken as a positive direction, since in this embodiment the pupil dividing means 18 is disposed after the anamorphic lens 7 (at the scan surface side), there is a relation $L_1 < 0$.

Furthermore, in order that the photodetecting device 19 is located at the image surface side after the pupil dividing means 18 and that the photodetecting device 19 is located before (deflecting means 5 side of) the scan surface 10, a condition $$L_1 < s_k < L + L_1 \quad (6)$$

should be satisfied.

In this embodiment, L=159.83 mm, $L_1$=−10.29 mm, and $s_k$=64.23 mm. Thus, expression (6) is satisfied.

If the lower limit of expression (6) is exceeded, it means that the photodetecting device 19 is disposed before the anamorphic lens 7. Thus, it is no more possible to detect the focal shift caused by the anamorphic lens 7.

On the other hand, if the upper limit of expression (6) is exceeded, the photodetecting device 19 is disposed after the scan surface 10, which means that the structure of the photodetecting device 19 becomes longer than the optical path length of the whole system.

FIG. 5 illustrates the light paths in the main-scan section and the sub-scan section in the in-focus state and the focal shift state of the second optical system (imaging optical system) 7A. The relationship between the amount of focal shift $\Delta x$ from the scan surface 10 and the movement amount Dd of the spot on the sensor 19 is expressed by an expression (7) below.

$$\Delta d = \frac{a s_k}{2(L+L_1)^2} \Delta x \quad (7)$$

where $\Delta d$ is the movement amount on the sensor 19 surface from the in-focus position when the focus is shifted, $\Delta x$ is the amount of focal shift in the optical axis direction, and a is the beam width of the light beam passing through one lens member of the pupil dividing means 18.

FIG. 6 is a schematic diagram illustrating the spot movement on the photodetecting device 19 as the sensing means, when a focal shift occurs.

Denoted at 62 is the distance (spacing) between two spots on the photodetecting device 19, passed through the two lens members of the pupil dividing means 18 in the in-focus state.

It is seen from expression (7) that, if the focus deviates in the negative direction, the spacing becomes narrower, like the spacing 61 of FIG. 6, than the spacing 62 in the in-focus state.

Similarly, if the focus deviates in the positive direction, the spacing becomes wider, like the spacing 63 of FIG. 6, than the spacing at the time of the in-focus state. By detecting the change of the spacing at this time, the direction of deviation and the amount of deviation are detected.

Furthermore, the spot diameter (diameter) D of the light beam is given by an expression (8) below.

The width D of the light beam spot with respect to the picture element array direction corresponds to the size as sliced at $1/e^2$ of the peak light quantity of the beam intensity distribution.

In expression (8), K is a constant which depends on the shape of the stop, and λ is the wavelength of the light.

$$D = K \frac{s_k}{a} \lambda \quad (8)$$

If the optical path length $s_k$ is erased from expressions (7) and (8), it follows that:

$$\frac{\Delta d}{D} = \frac{a^2}{2K(L+L_1)^2 \lambda} \Delta x \quad (9)$$

Expression (9) is a relational expression when no error is taken into account. If an error is considered in expression (9), then an expression (10) such as follows is obtained.

$$\frac{\Delta d + \delta}{D} = \frac{a^2}{2K(L+L_1)^2 \lambda} (\Delta x + \delta_x) \quad (10)$$

where δ is the error, and δx is the error of focal shift amount caused by the error δ.

FIG. 7 and FIG. 8 are schematic diagrams of a detection signal at the photodetecting device 19 in the present embodiment. FIG. 7 illustrates a detection signal in the sub-scan direction, and FIG. 8 illustrates a detection signal in the main-scan direction. The magnitude of the focal shift can be detected by determining the spacing of peaks of spots depicted by a double-headed arrow in the diagram, based on a correlation calculation to be described below.

When the correlation calculation is carried out, there is a relationship such as shown in FIG. 4 between the calculation error and D/b which corresponds to the ratio of the spot diameter D to the size of one picture element of the photodetecting device 19.

Here, b is size of one picture element constituting the photodetector 19.

The result of FIG. 4 means that, if D/b becomes larger, the calculation error reduces and the detection precision increases.

If the following relationship is satisfied, from FIG. 4, the calculation error becomes not more than 30% relative to the spot diameter D.

$$D \geq b \qquad (11)$$

In order to prevent that a calculation error of the correlation calculation as one error factor goes over the detection resolving power $\Delta X$, a relation $\delta x \leq \Delta x$ should be maintained. Thus, it is necessary to satisfy an expression (12) below.

$$\frac{\delta}{D} \leq \frac{a^2}{2K(L+L_1)^2 \lambda} \Delta X \qquad (12)$$

With regard to the structure of the optical system, if D=b, it is seen from FIG. 4 that $\delta/D$=0.3.

In this embodiment, in a case of an optical system in which a=3.02 mm, L=159.83 mm, $L_1$=−10.29 mm, K=1.64 and $\lambda$=670 nm, from expression (12) it follows that the detection resolving power of the focal shift is 1.62 mm.

Furthermore, if D≥b is realized, the detection resolving power of the focal shift can be made not greater than 1.62 mm. Thus, more precise detection is enabled.

For example, when the calculation error $\delta/D$ is going to be suppressed to 5% or less, from FIG. 4 there should be D≥1.71b. Here, in the present embodiment, from expression (12) it is seen that the detection resolving power becomes not greater than 0.269 mm, and more precise detection is enabled.

In this manner, in accordance with the required detection resolving power, the sensor pitch and the size of the spot diameter can be determined appropriately. If the range of expression (11) is not met, the error of the arithmetic will exceed the resolving power.

Next, the AF (autofocus) control method in the present embodiment will be explained with reference to FIGS. 9-15.

The arithmetic unit 20 in the present embodiment comprises signal separating means for separating output data streams from the picture elements of the photodetecting device 19 in accordance with the number of lens members of the pupil dividing means 18.

Furthermore, there is correlation amount calculating means which uses, among the signals separated by the signal separating means, either at least two signals in the main-scan direction or at least two signals in the sub-scan direction, or both of these, to shift the respective output data streams thereby to calculate the correlation amount.

Furthermore, there is a shift value determining means for determining the shift amount which provides the largest correlation amount, based on the correlation amount as calculated by the correlation amount calculating means.

Based on the shift value obtained from the shift value determining means, the focal position information of the light to be imaged on the scan surface is detected.

Figure 9:
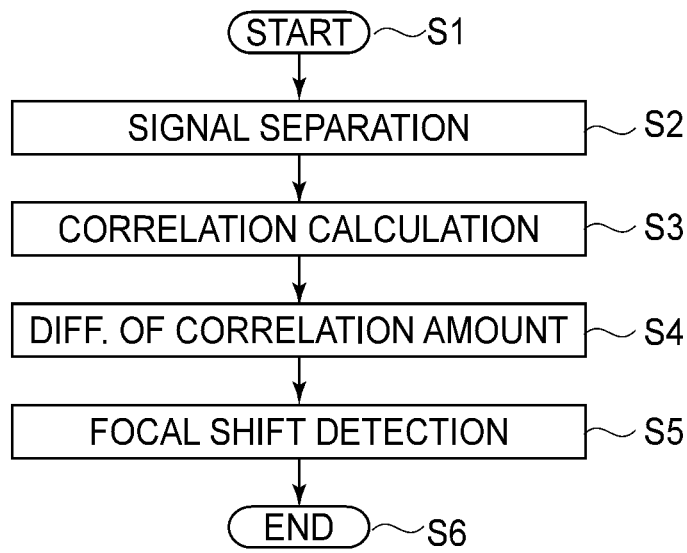
FIG. 9 is a flow chart of the correlation calculation.
Figure 10:
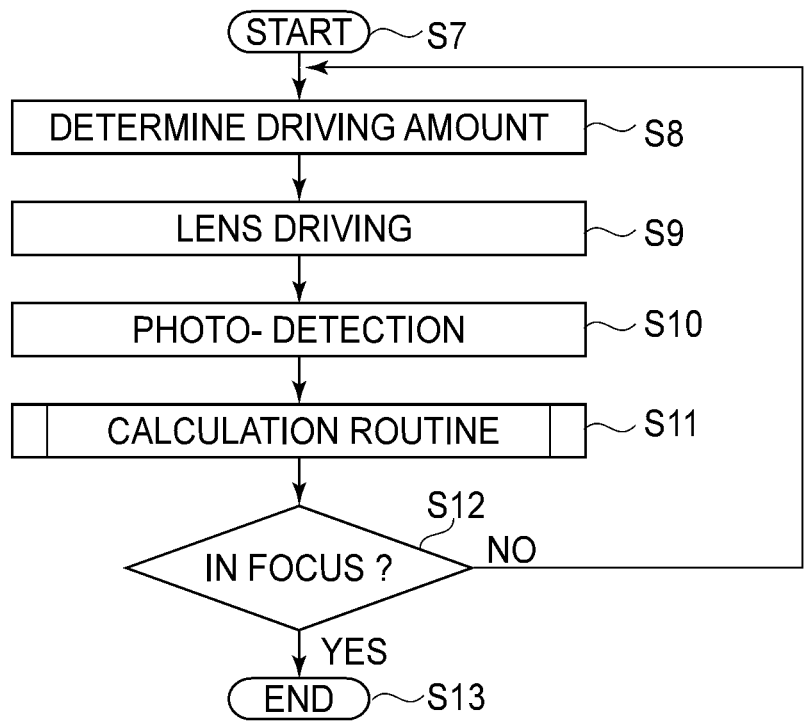
FIG. 10 is a flow chart of autofocusing (AF).
Figure 11:
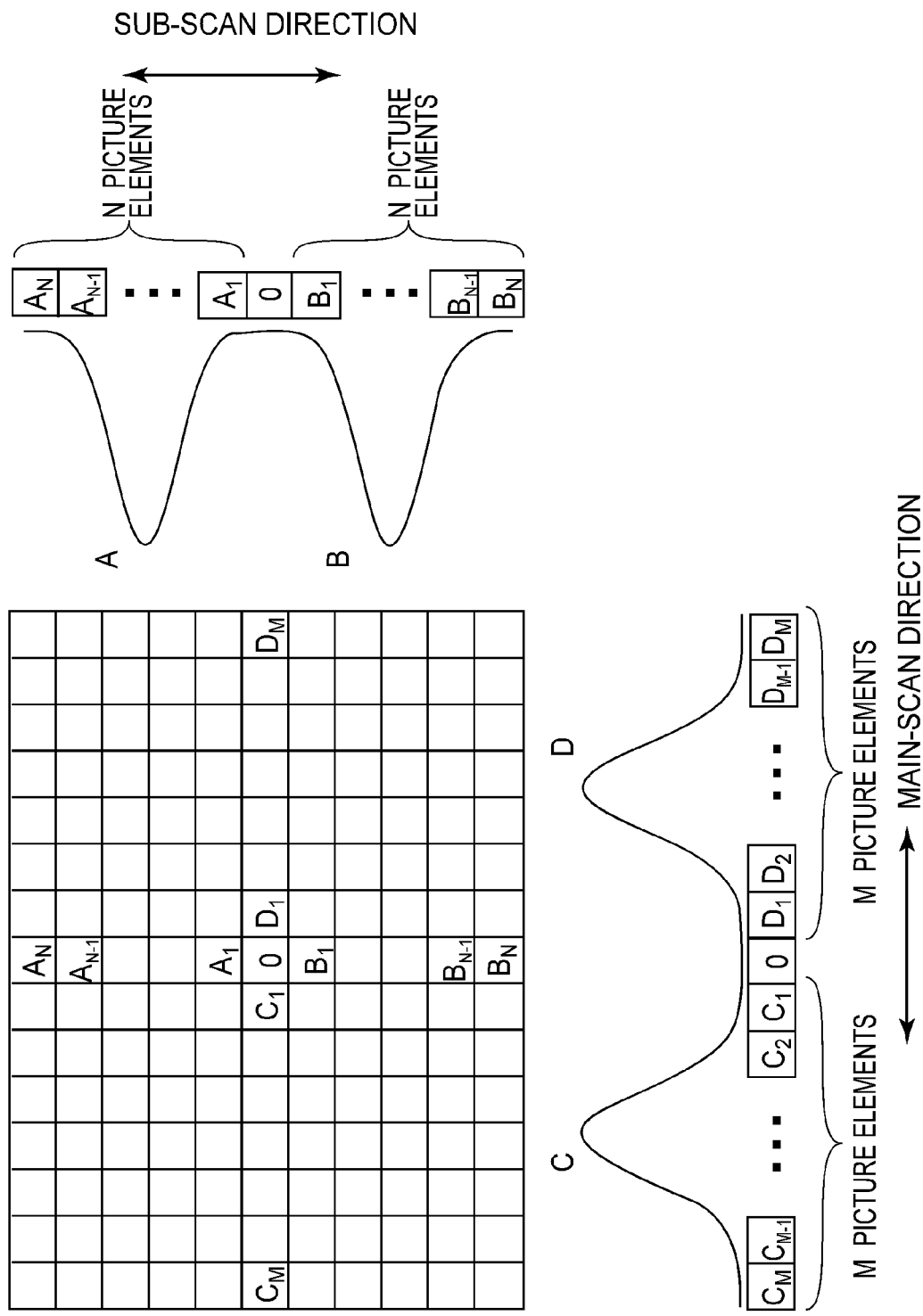
FIG. 11 is a schematic diagram illustrating the relationship between the array of picture elements at the photodetecting device and detection signals.
Figure 12:
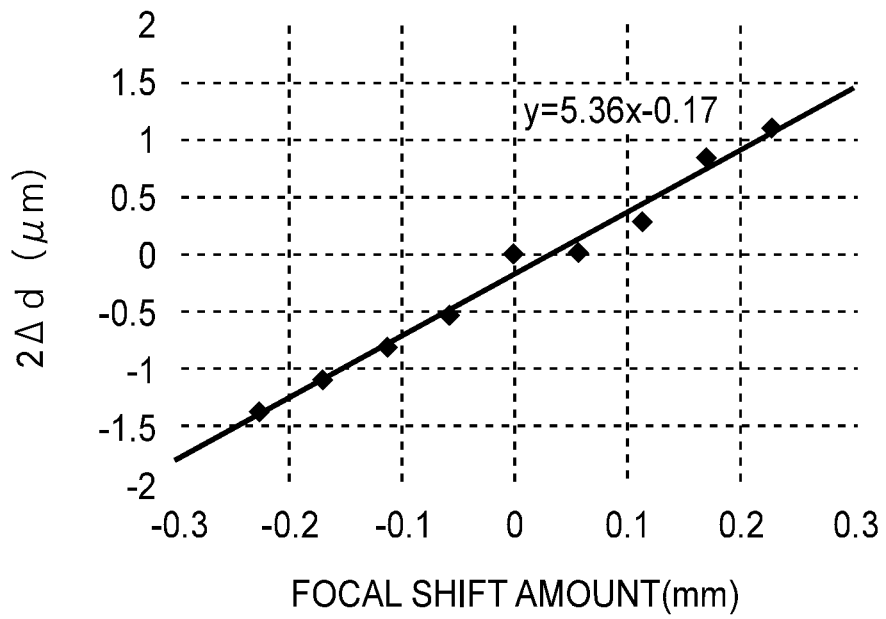
FIG. 12 is a graph illustrating the relationship between the focal shift in the sub-scan direction and the amount of change of the spacing.

FIG. 9 is a flow chart of correlation calculation. FIG. 10 is a flow chart of autofocusing (AF). FIG. 11 is a diagram illustrating the relationship between the array of picture elements at the photodetecting device 19 and the detection signal. FIG. 12 is a graph illustrating the relationship between the focal shift in the sub-scan direction and the amount of change of the spacing.

Figure 13:
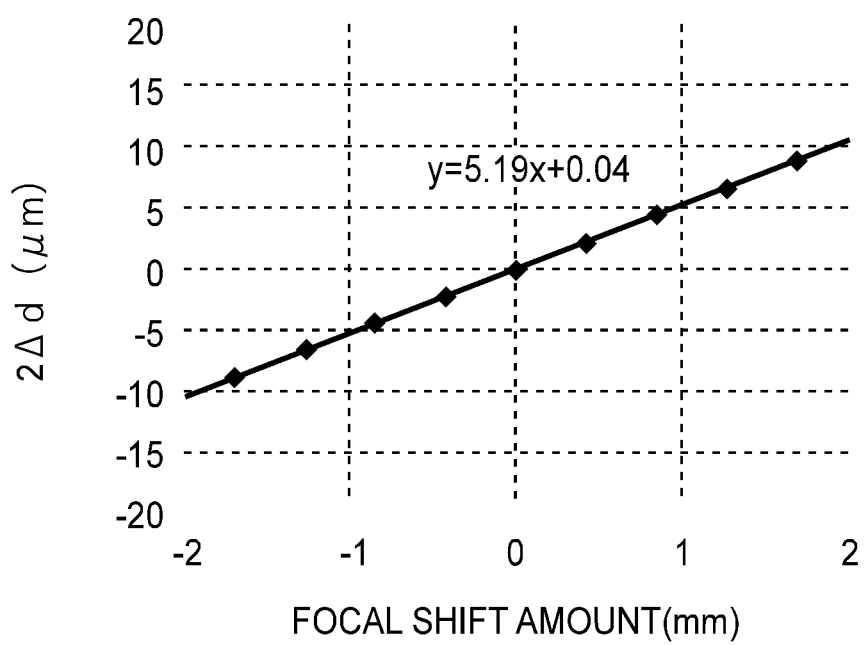
FIG. 13 is a graph illustrating the relationship between the focal shift in the main-scan direction and the amount of change of the spacing.
Figure 14:
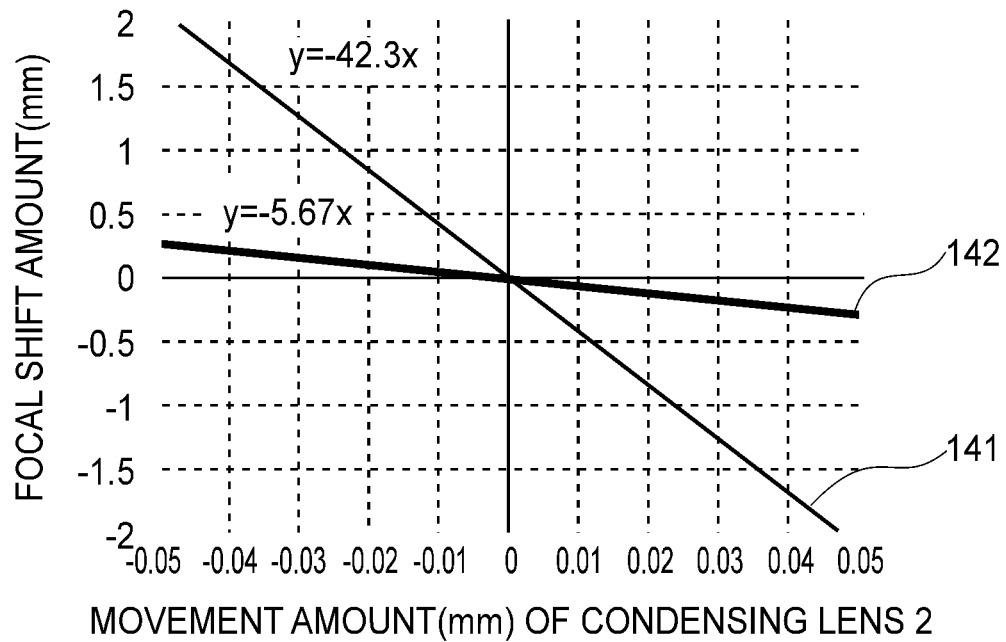
FIG. 14 is a graph illustrating the sensitivity of the focus with respect to the movement amount of a condenser lens 2 in the optical axis direction.
Figure 15:
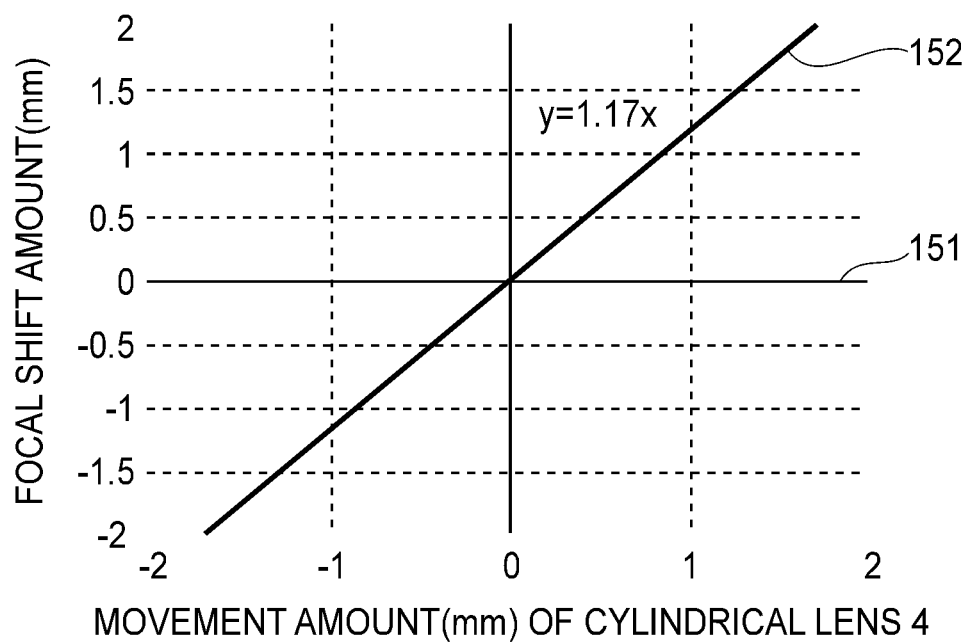
FIG. 15 is a graph illustrating the sensitivity of the focus with respect to the movement amount of a cylindrical lens 4 in the optical axis direction.

FIG. 13 is a graph illustrating the relationship between the focal shift in the main-scan direction and the amount of change of the spacing. FIG. 14 is a graph illustrating the sensitivity of the focus with respect to the movement amount of the condenser lens 2 in the optical axis direction. FIG. 15 is a graph illustrating the sensitivity of the focus with respect to the movement amount of the cylindrical lens 4 in the optical axis direction.

In FIG. 9, Step S1 is "start" which means a step of initiating the correlation calculation. Step S2 is "signal separation" which means a step of dividing the output data into two signals of picture element series A and B and picture element series C and D, respectively, with respect to the main-scan direction and the sub-scan direction (see FIG. 11).

Step S3 is "correlative calculation" which means a step of performing the correlation calculation to detect the correlation amount. Step S4 is "difference of correlation amount" which means a step of differencing the correlation amount obtained at step S3 to determine the shift amount with which the correlation amount becomes a largest. Step S5 is "focal shift detection" which means a step of detecting the amount and direction of the focal shift, based on the shift amount obtained at step S4.

Step S6 is "end" which means the step where the correlation calculation sequence is completed.

In FIG. 10, step S7 is "start" which means a step of initiating the autofocusing (AF). Step S8 is "driving amount determination" which means a step of determining the amount of driving based on the sensitivity and from the result obtained at step S5. Step S9 is "lens driving" which means a step of driving the lens 2 or 4 based on the result obtained at step S8.

Step S10 is "photo-detection" which means a step of performing the photo-detection to discriminate whether the focus has been corrected or not. Step S11 is "calculation routine" which means a step where the calculations at steps S1 through S6 are carried out. Step S12 is "in-focus discrimination" which means a step of discriminating whether or not there is a focal shift, based on the result obtained at step S4. Step S13 is "end" which means a step where the sequence ends.

In FIG. 14, a line 141 depicts the sensitivity of the condenser lens 2 in the main-scan direction, and it represents the relationship between the movement amount of the condenser lens 2 in the optical axis direction and the amount of the focal shift in the main-scan direction. A line 142 depicts the sensitivity of the condenser lens 2 in the sub-scan direction, and it represents the relationship between the movement amount of the condenser lens 2 in the optical axis direction and the amount of the focal shift in the sub-scan direction.

In FIG. 15, a line 151 depicts the sensitivity of the cylindrical lens 4 in the main-scan direction, and it represents the relationship between the movement amount of the cylindrical lens 4 in the optical axis direction and the amount of the focal shift in the main-scan direction. A line 152 depicts the sensitivity of the cylindrical lens 4 in the sub-scan direction, and it represents the relationship between the movement amount of the cylindrical lens 4 in the optical axis direction and the amount of the focal shift in the sub-scan direction.

In the autofocusing (AF) sequence which starts at step S7, in the first-time control operation, a value "0" is returned to step S8 and step S9, and then the first-time photo-detection with the photodetecting device 19 is carried out at step S10. At step S10, output data is produced with respect to each picture element.

Subsequently, the sequence goes to the calculation routine at step S11. At step S11, the processes of steps S1 through S7 are carried out. First of all, at step S2, the total number of picture elements of the photodetecting device 19 arrayed one-dimensionally in the main-scan direction is taken as 2M+1 (picture elements), while the total number of picture elements arrayed one-dimensionally in the sub-scan direction is taken as 2N+1 (picture elements).

As shown in FIG. 11, the signal separation process is carried out to obtain two signals: that is, a signal waveform A detected by those photodetecting elements which are in the positive direction along the sub-scan direction; and a signal waveform B detected by those photodetecting elements which are in the negative direction along the sub-scan direction. Also, it is carried out to obtain two signals: that is, a signal waveform C detected by those photodetecting elements which are in the positive direction along the main-scan direction; and a signal waveform D detected by those photodetecting elements which are in the negative direction along the main-scan direction.

Here, the output data of the i-th picture element is taken as $A_i$, $B_i$, $C_j$ and $D_j$, respectively (i=1 . . . N, j=1 . . . M). Subsequently, at step S3, the output data stream B is successively shifted by picture elements of a number n at a time, and the correlation amount $U_n$ (n=0 . . . N) in the sub-scan direction is detected based on the calculation according to expression (13). Also, the output data stream D is successively shifted by picture elements of a number m at a time, and the correlation amount $V_m$ (m=0 . . . M) in the main-scan direction is detected based on the calculation according to expression (14).

$$U_n = \sum_{i=n+1}^{N} A_i B_{i-n} \tag{13}$$

$$V_m = \sum_{j=m+1}^{N} C_j D_{j-m} \tag{14}$$

Subsequently, at step S4, in order to determine the shift value with which a largest correlation amount is obtainable on the basis of the correlation amounts $U_n$ and $V_m$ obtained by these calculation, the correlation amount is differenced using expression (15) and expression (16).

$$U'_n = \frac{U_{n+1} - U_{n-1}}{2} \tag{15}$$

$$V'_m = \frac{V_{m+1} - V_{m-1}}{2} \tag{16}$$

The shift amount with which the difference value $U'_n$ in expression (15) becomes equal to zero corresponds to the spacing of spots in the main-scan direction, imaged on the photodetecting device 19. Furthermore, the shift amount with which the difference value $v'_m$ in expression (16) becomes equal to zero corresponds to the spacing of spots in the main-scan direction, imaged on the photodetecting device 19.

At step S5, the spot spacing on the photodetecting device 19 obtained at step S4 is compared with the spacing when there is no focal shift, and based on this, the focal shift is decided.

In this embodiment, the amount of focal shift in the sub-scan direction and the change 2Δd of the spacing are such as shown in FIG. 12. Furthermore, the amount of focal shift in the main-scan direction and the change 2Δd of the spacing are such as shown in FIG. 13.

Thereafter, the sequence goes to step S12 whereat, when the focal shift amount Δx obtained at step S5 is smaller than the detection resolution ΔX, i.e., Δx≤ΔX, the state is concluded as being in-focus, and the sequence goes to step S3 by which the autofocusing is finished.

If on the other hand the focal shift amount Δx obtained at step S5 is discriminated at step S12 as being larger than the detection resolution ΔX, i.e., Δx>ΔX, the state is concluded as being out-of-focus, and the sequence goes back to step S8, and the amount of driving a lens of the first optical system is calculated so as to correct the focus.

At step S8, the driving amounts of the condenser lens 2 and the cylindrical lens 4 are determined based on the sensitivity of the focus position with respect to the movement of the condenser lens 2 and the cylindrical lens 4 of the first optical system 4A in the optical axis direction.

In this embodiment, it is seen from the sensitivity lines 141 and 142 of FIG. 14 that, when the condenser lens 2 moves in the optical axis direction by 1 mm, the focus in the main-scan direction shifts by −42.3 mm (sensitivity line 141) and the focus in the sub-scan direction shifts by −5.67 mm (sensitivity line 142).

Furthermore, it is seen from the sensitivity lines 151 and 152 of FIG. 15 that, when the cylindrical lens 4 moves in the optical axis direction by 1 mm, the focus in the main-scan direction shifts by 0 mm (sensitivity line 151) and the focus in the sub-scan direction shifts by 1.17 mm (sensitivity line 152).

For example, if the focus deviates by 0.5 mm in the main-scan direction and 0.3 mm in the sub-scan direction, in order to correct the focal shift in the main-scan direction, it is seen from the sensitivity line 141 of FIG. 14 that the condenser lens 2 should be moved by 0.5/(−42.3)=−0.012 (mm). Furthermore, with regard to the correction of the focal shift in the sub-scan direction, while the focus change by the movement of the condenser lens 2 is taken into account, it is seen from the sensitivity line 142 of FIG. 14 and the sensitivity line 152 of FIG. 15 that the cylindrical lens 4 should be moved by {−5.67*(−0.012)+0.3}/1.17=0.31 (mm).

Then, the sequence goes to step S9 where the condenser lens 2 and the cylindrical lens 4 are driven at the same time by the driving device 30 based on the result obtained at step S8 (claim 5). Subsequently, the sequence goes to step S10 where the above-described procedure is repeated. When, at step S12, the in-focus state is concluded, the sequence goes to step S13, and the autofocusing is finished.

One best mode of the present invention has been described above. In the present invention, the optical deflector 5 is not limited to a polygon mirror, and mirror swinging means may be used. Furthermore, although the pupil dividing means 18 uses a plano-convex lens, since the function is to collect the light to the photodetecting device 19, the shape is not limited to this. A biconvex lens, a meniscus shaped lens or other lenses may be used with similar advantageous effects.

Furthermore, the shape of the lens surface of the pupil dividing means is not limited to a spherical shape. An aspherical lens for correction of spherical aberration or the like may be used with similar advantageous effects.

Figure 2A:
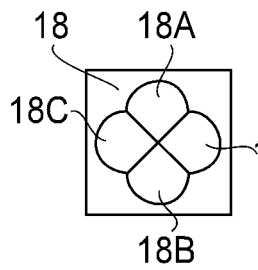
FIGS. 2A-2C are schematic diagrams each illustrating the shape of pupil dividing means having four lens members.
Figure 2B:
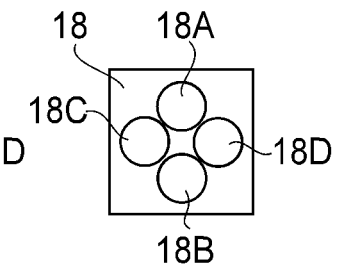
Figure 2C:
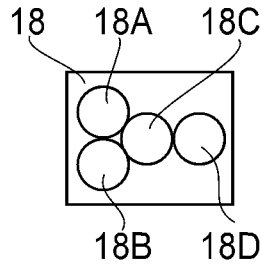

The pupil dividing means 18 is shown in FIG. 2A, but it may be modified such as shown in FIG. 2A or FIG. 2C with similar advantageous effects. When the example of FIG. 2C is used, the photodetecting device 19 may comprise two line sensors each having picture elements arrayed one-dimensionally in the main-scan direction or the sub-scan direction.

Furthermore, the correlation calculation of the arithmetic unit 20 may be based on any other method such as one taking the difference with respect to each picture element or one well known in the art.

A cylindrical lens having a power only in the main-scan direction for focus adjustment in the main-scan direction may be incorporated into the first optical system, as an element for controlling the AF (autofocus). In that occasion, when the focal shift in main-scan direction and the sub-scan direction is controlled with these two cylindrical lenses, similar advantageous effects are provided.

Furthermore, the driven direction is not limited to the optical axis direction. The lenses may be moved in the main-scan direction or in the sub-scan direction. Any eccentric movement such as tilt or swinging may be added.

Embodiment 2

Figure 16:
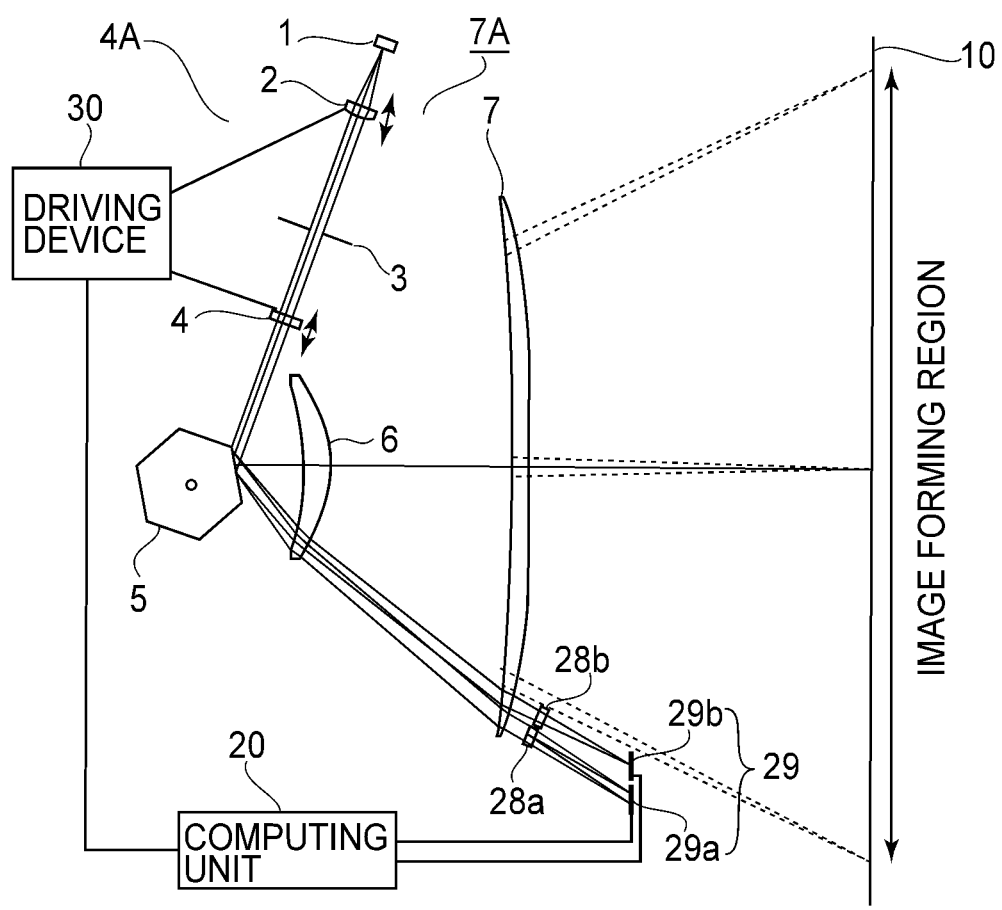
FIG. 16 is a schematic diagram illustrating a second embodiment of the present invention.
Figure 18:
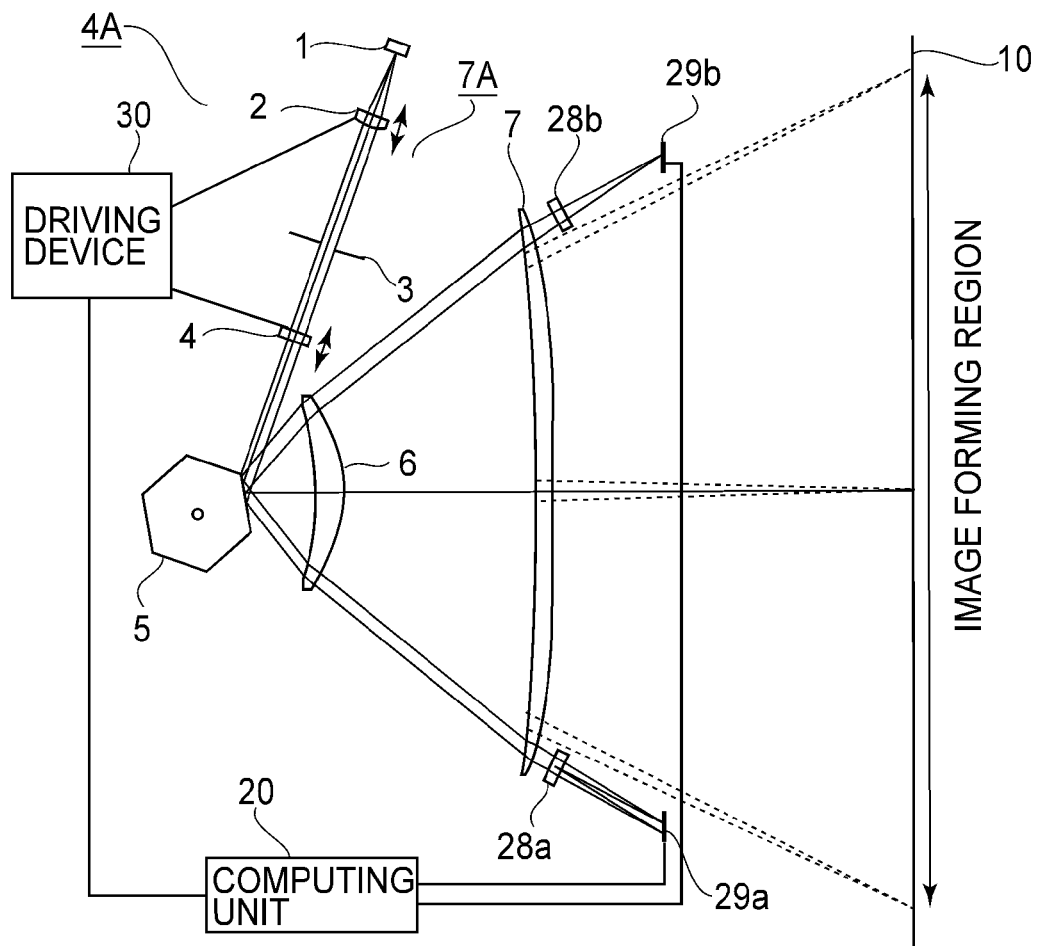
FIG. 18 is a schematic diagram illustrating an example where a portion of the second embodiment of the present invention has been modified.

FIG. 16 through FIG. 18 are schematic diagrams of a second embodiment of the present invention.

FIG. 16 is a schematic diagram in the main-scan section of the second embodiment of the present invention. FIGS. 17A-17C are schematic diagrams each illustrating the shape of the pupil dividing means of FIG. 16. FIG. 18 illustrates a modified form of the second embodiment.

In these drawings, denoted at 1 is light source means which comprises a semiconductor laser, for example. Denoted at 2 is a condenser lens (collimator lens) which serves to convert a light beam emitted from the light source means 1 into an approximately parallel light beam (or a divergent light beam or a convergent light beam). Denoted at 3 is an aperture stop which functions to shape the light beam from the condenser lens 2 into an optimum beam profile. Denoted at 4 is a cylindrical lens which has a finite power (refracting power) only in the sub-scan direction (sub-scan section).

The condenser lens 2 and the cylindrical lens 4 constitute a portion of a first optical system 4A. Denoted at 5 is an optical deflector (polygon mirror) as deflecting means. It is rotated at a constant speed in a predetermined direction by driving means such as a motor, not shown.

Denoted at 7A is an imaging optical system as a second optical system. It comprises imaging lenses (anamorphic lenses) 6 and 7 having different powers in the main-scan section and the sub-scan section, respectively. Denoted at 28a is pupil dividing means which comprises two lens members in the main-scan direction. Denoted at 28b is pupil dividing means which comprises two lens members in the sub-scan direction. These pupil dividing means 28a and 28b constitute a third optical system.

Denoted at 29a is a photodetecting device which is disposed near the position where the light beam from the pupil dividing means 28a is imaged. The photodetecting device 29a is comprised of, for example, an area sensor having picture elements arranged one-dimensionally in the main-scan direction. Denoted at 29b is a photodetecting device which is disposed near the position where the light beam from the pupil dividing means 28b is imaged. The photodetecting device 29b is comprised of, for example, an area sensor having picture elements arranged one-dimensionally in the sub-scan direction.

The light collected onto the photodetecting device 29a or 29b is electrically converted, and output data is produced with respect to each picture element. Denoted at 20 is an arithmetic unit which operates to detect, using the result prepared by the photodetecting devices 29a and 29b, the light convergence position (focus position) on the scan surface in accordance with the correlation calculation to be described below. It determines the driving amount for at least one of the condenser lens 2 and the cylindrical lens 4 to shift the light beam from the detected convergence position back to the in-focus position so that the light beam is incident on the scan surface 10 accurately in its in-focus state.

Denoted at 30 is a driving device which drives at least one of the condenser lens 2 and the cylindrical lens 4 of the first optical system 4A, in the optical axis direction based on the result obtained at the arithmetic unit 20.

In this embodiment, the light beam emitted from the light source means 1 is converted into an approximately parallel light beam by the condenser lens 2. Then, the light beam diameter is restricted by a stop 3.

Subsequently, the restricted light beam is converted into a convergent light beam in the sub-scan section by means of the cylindrical lens 4, and then the light beam is incident on the deflecting means 5 such as a polygon mirror. Subsequently, the light beam scanningly deflected by the deflecting surface of the deflecting means 5 goes through the anamorphic lenses 6 and 7, and it scans the scan surface 10 such as a photosensitive drum at a constant speed. These components constitute a second optical system 7A. The characteristics of the second optical system 7A in the present embodiment are shown in Table 1. The pupil dividing means 28 and 28b are disposed at the position where the scanning light outside the image forming region, having passed through the first and second optical systems 4A and 7A, go through.

More specifically, after the anamorphic lens 7, there are pupil dividing means 28a having two lens members (28C and 28D) in the main-scan direction and pupil dividing means 28b having two lens members (28A and 28B) in the sub-scan direction.

The photodetecting device 29a is disposed at or near the imaging position of the light beam from the pupil dividing means 28a. The photodetecting device 29a is comprised of, for example, a line sensor having picture elements arranged one-dimensionally in the main-scan direction. The photodetecting device 29b is disposed at or near the imaging position of the light beam from the pupil dividing means 28b. The photodetecting device 29b is comprised of, for example, a line sensor having picture elements arranged one-dimensionally in the sub-scan direction.

Next, details of the focal point detecting device (AF detecting device) which is an important feature of the present embodiment will be explained.

In this embodiment, the parameters are L=159.83 mm, L1=−10.29 mm and $s_k$=64.23 mm. Thus, expression (6) is satisfied.

The detection signal at the photodetecting device 29 in the present embodiment is such as shown in FIG. 7 and FIG. 8, like the first embodiment. FIG. 7 shows the detection signal in the sub-scan direction, and FIG. 8 shows the detection signal in the main-scan direction. The magnitude of the focal shift can be determined by detecting the spacing of the spot peaks which is depicted by double-headed arrow in the drawing, based on the correlation calculation.

With regard to the structure of the optical system, if D=b, it is seen from FIG. 4 that δ/D=0.3.

In this embodiment, in a case of an optical system in which a=3.02 mm, L=159.83 mm, $L_1$=−10.29 mm, K=1.64 and λ=670 nm, from expression (12) it follows that the detection resolving power of the focal shift is 1.38 mm.

Furthermore, if D≥b is realized, the detection resolving power of the focal shift can be made not greater than 1.38 mm. Thus, more precise detection is enabled. Hence, in accordance with the required detection resolving power, the sensor pitch and the size of the spot diameter can be determined appropriately.

The AF (autofocus) can be done in a similar method as the first embodiment.

In second embodiment, the pupil dividing means 28a and 28b may be disposed outside the upper and lower image forming regions such as shown in FIG. 18. Even in that occasion, similar advantageous effects are obtainable.

Furthermore, as a deformation of the pupil dividing means 28a and 28b shown in FIG. 17A, those examples shown in FIG. 17B and FIG. 17C may be used with similar advantageous effects. Furthermore, the lens members 28C and 28D in FIG. 17C may be a cylindrical lens having a power only in the main-scan direction. On the other hand, the lens member 28A and 28B may be a cylindrical lens having a power only in the sub-scan direction.

Furthermore, the correlation calculation of the arithmetic unit 20 may be based on any other method such as one taking the difference with respect to each picture element or one well known in the art.

A cylindrical lens having a power only in the main-scan direction for focus adjustment in the main-scan direction may be incorporated into the first optical system, as an element for controlling the AF (autofocus). In that occasion, when the focal shift in main-scan direction and the sub-scan direction is controlled with these two cylindrical lenses, similar advantageous effects are provided.

Furthermore, the driven direction is not limited to the optical axis direction. The lenses may be moved in the main-scan direction or in the sub-scan direction. Any eccentric movement such as tilt or swinging may be added.

Embodiment 3

Figure 19:
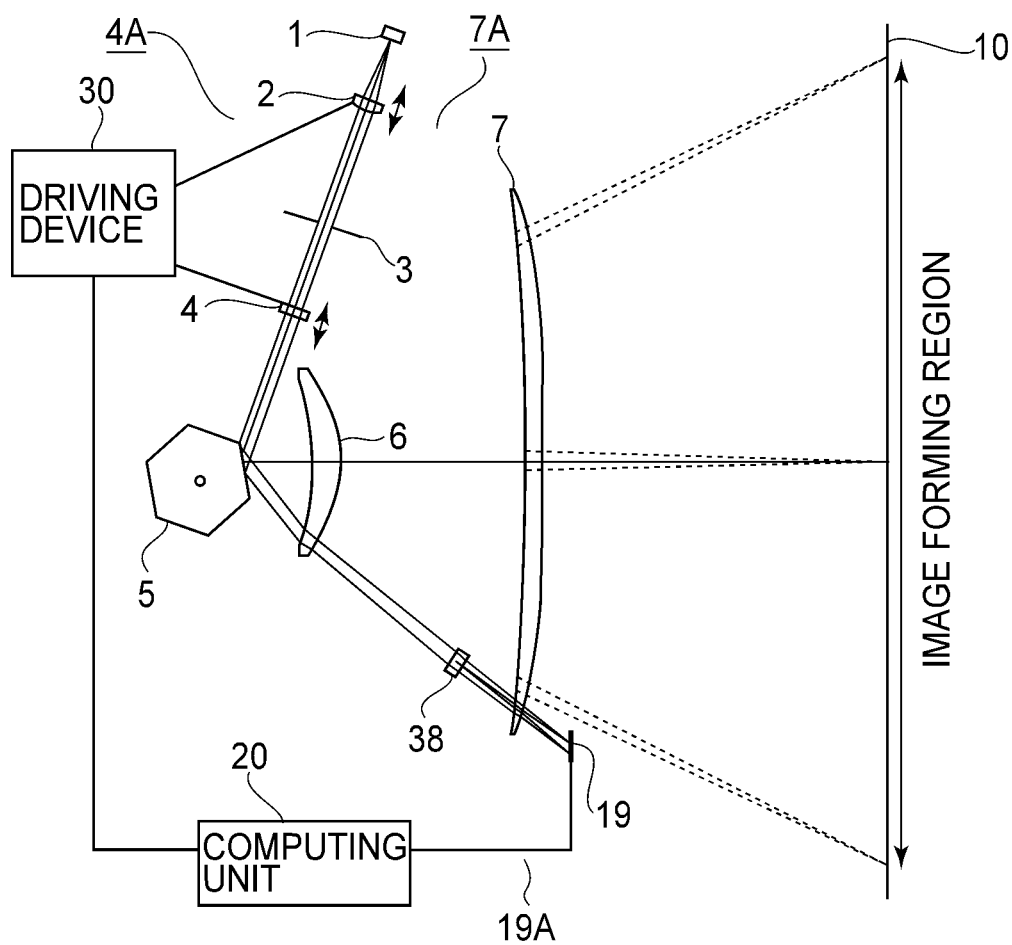
FIG. 19 is a schematic diagram illustrating a third embodiment of the present invention.
Figure 21:
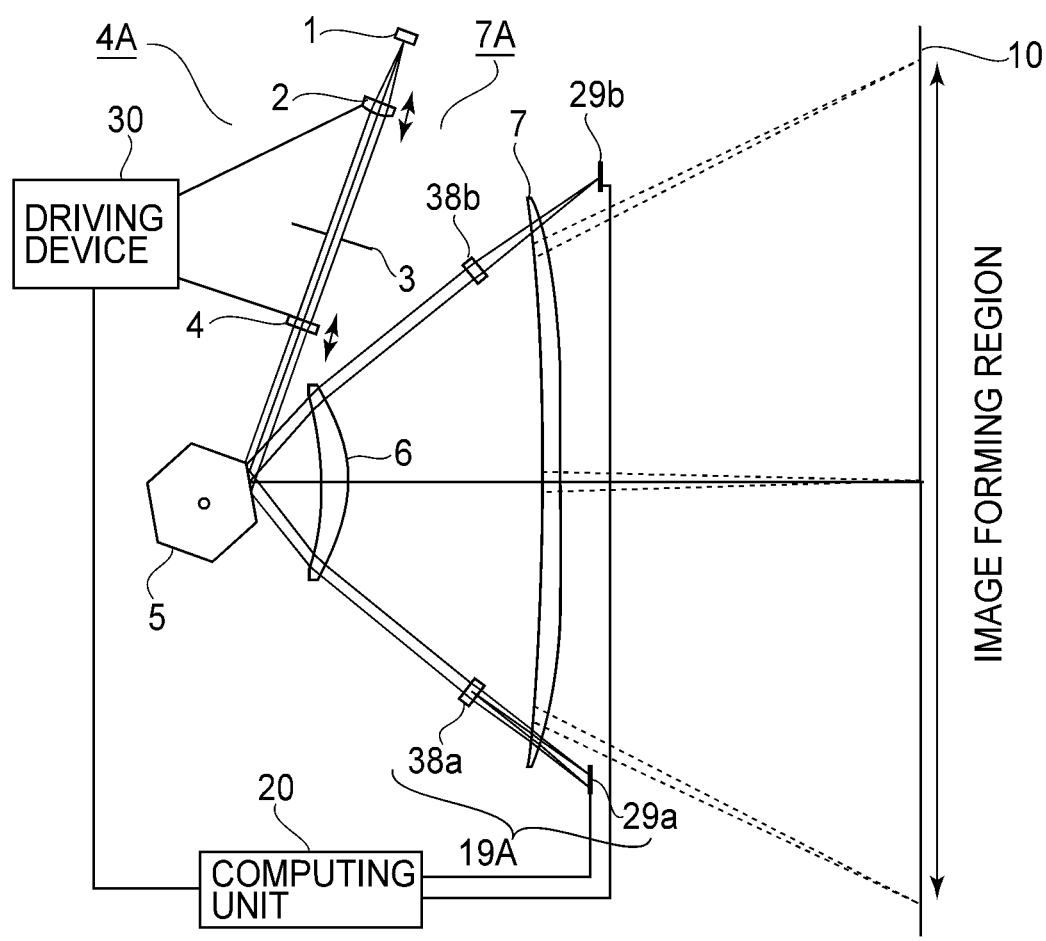
FIG. 21 is a schematic diagram illustrating an example where a portion of the third embodiment of the present invention has been modified.

FIG. 19 through FIG. 21 are schematic diagrams of a third embodiment of the present invention.

FIG. 19 is a schematic diagram in the main-scan section of the third embodiment of the present invention. FIG. 20 is a schematic diagram illustrating the positional relationship of a detecting system 19A in an example wherein pupil dividing means 38 is disposed before (deflecting means 5 side of) an optical element 7 of a second optical system 7A which element is closest to the scan surface. FIG. 21 illustrates a modified form of the third embodiment.

In these drawings, denoted at 1 is light source means which comprises a semiconductor laser, for example. Denoted at 2 is a condenser lens (collimator lens) which serves to convert a light beam emitted from the light source means 1 into an approximately parallel light beam (or a divergent light beam or a convergent light beam). Denoted at 3 is an aperture stop which functions to shape the light beam from the condenser lens 2 into an optimum beam profile. Denoted at 4 is a cylindrical lens which has a finite power (refracting power) only in the sub-scan direction (sub-scan section).

The condenser lens 2 and the cylindrical lens 4 constitute a portion of a first optical system 4A. Denoted at 5 is an optical deflector (polygon mirror) as deflecting means. It is rotated at a constant speed in a predetermined direction by driving means such as a motor, not shown.

Denoted at 7A is an imaging optical system as a second optical system. It comprises imaging lenses (anamorphic lenses) 6 and 7 having different powers in the main-scan section and the sub-scan section, respectively. Denoted at 38 is pupil dividing means which comprises, like FIG. 2, four lens members including two in the main-scan direction and two in the sub-scan direction. Denoted at 19 is a photodetecting device which is disposed at or near the position where the light beam from the pupil dividing means 38 is imaged. The photodetecting device 19 is comprised of, for example, an area sensor having picture elements arranged two-dimensionally in the main-scan direction and the sub-scan direction.

The light collected onto the photodetecting device 19 is electrically converted, and output data is produced with respect to each picture element. Denoted at 20 is an arithmetic unit which operates to detect, using the result prepared by the photodetecting device 19, the light convergence position on the scan surface in accordance with the correlation calculation to be described below. It determines the driving amount for at least one of the condenser lens 2 and the cylindrical lens 4 to shift the light beam from the detected convergence position back to the in-focus position.

Denoted at 30 is a driving device which drives at least one of the condenser lens 2 and the cylindrical lens 4 of the first optical system 4A, based on the result obtained at the arithmetic unit 20.

In this embodiment, the light beam emitted from the light source means 1 is converted into an approximately parallel light beam by the condenser lens 2. Then, the light beam diameter is restricted by a stop 3. Subsequently, the restricted light beam is converted into a convergent light beam in the sub-scan section by means of the cylindrical lens 4, and then the light beam is incident on the deflecting means 5 such as a polygon mirror.

Subsequently, the light beam scanningly deflected by the deflecting means 5 goes through the anamorphic lenses 6 and 7, and it scans the scan surface 10 such as a photosensitive drum at a constant speed. Table 1 shows the characteristics of the second optical system 7A in the present embodiment.

The pupil dividing means 38 which is comprised of four lens members including two in the main-scan direction and two in the sub-scan direction such as shown in FIG. 2A, is disposed at the position where the scanning light outside the image forming region, having passed through the first and second optical systems 4A and 7A, go through and the position which is before the anamorphic lens 6.

Furthermore, the photodetecting device 19 is disposed at or near the imaging position of the light beam from the pupil dividing means 38. The photodetecting device 19 is comprised of, for example, an area sensor having picture elements arranged two-dimensionally in the main-scan direction and the sub-scan direction.

Next, the AF detecting unit which is an important feature of the present embodiment will be explained. The AF detecting unit is comprised of a detecting system 19A including pupil dividing means 38 and a photodetecting device 19.

In this embodiment, the optical element 7 among the second optical system 7A which is closest to the scan surface 10 is an anamorphic lens.

FIG. 20 illustrates the positional relationship of the anamorphic lens 7, pupil dividing means 38, photodetecting device 19 and the scan surface 10.

Here, denoted at $L_1$ is the optical path length from the pupil dividing means 38 to the anamorphic lens 7. Denoted at L is the optical path length from the anamorphic lens 7 to the scan surface 10. Denoted at $s_k$ is the optical path length from the pupil dividing means 38 to the photodetecting device 19.

If the advancement direction of the light is taken as a positive direction, since in this embodiment the pupil dividing means 38 is disposed before the anamorphic lens 7, there is a relation $L_1>0$. Furthermore, in order that the photodetecting device 19 is located after the anamorphic lens 7 and that photodetecting device is located before the scan surface 10, a condition $L_1<s_k<L+L_1$ should be satisfied.

In this embodiment, L=159.83 mm, L₁=10 mm, and $s_k$=64.23 mm. Thus, expression (6) is satisfied.

With regard to the structure of the optical system, if D=b, it is seen from FIG. 4 that δ/D=0.3.

In this embodiment, in a case of an optical system in which a=3.02 mm, L=159.83 mm, L₁=10 mm, K=1.64 and λ=670 nm, from expression (12) it follows that the detection resolving power of the focal shift is 2.08 mm.

Furthermore, if D≥b is realized, the detection resolving power of the focal shift can be made not greater than 2.08 mm. Thus, more precise detection is enabled. Hence, in accordance with the required detection resolving power, the sensor pitch and the size of the spot diameter can be determined appropriately.

The autofocusing (AF) can be done in a similar method as the first embodiment.

In this embodiment, the pupil dividing means 38 may have shapes such as shown in FIGS. 2A, 2B and 2C. When the example of FIG. 2C is used, the photodetecting device 19 may comprise two line sensors having picture elements arranged one-dimensionally in the main-scan direction or the sub-scan direction.

Furthermore, as shown in FIG. 21, the pupil dividing means 38 may be divided into two pupil dividing means 38a and 38b across the optical axis of second optical system 7A. Similar advantageous effects are obtainable in that occasion as well.

Furthermore, the correlation calculation of the arithmetic unit 20 may be based on any other method such as one taking the difference with respect to each picture element or one well known in the art.

A cylindrical lens having a power only in the main-scan direction for focus adjustment in the main-scan direction may be incorporated into the first optical system 4A, as an element for controlling the AF (autofocus). In that occasion, when the focal shift in main-scan direction and the sub-scan direction is controlled with these two cylindrical lenses, similar advantageous effects are provided.

Furthermore, the driven direction is not limited to the optical axis direction. The lenses may be moved in the main-scan direction or in the sub-scan direction. Any eccentric movement such as tilt or swinging may be added.

Embodiment 4

Figure 22:
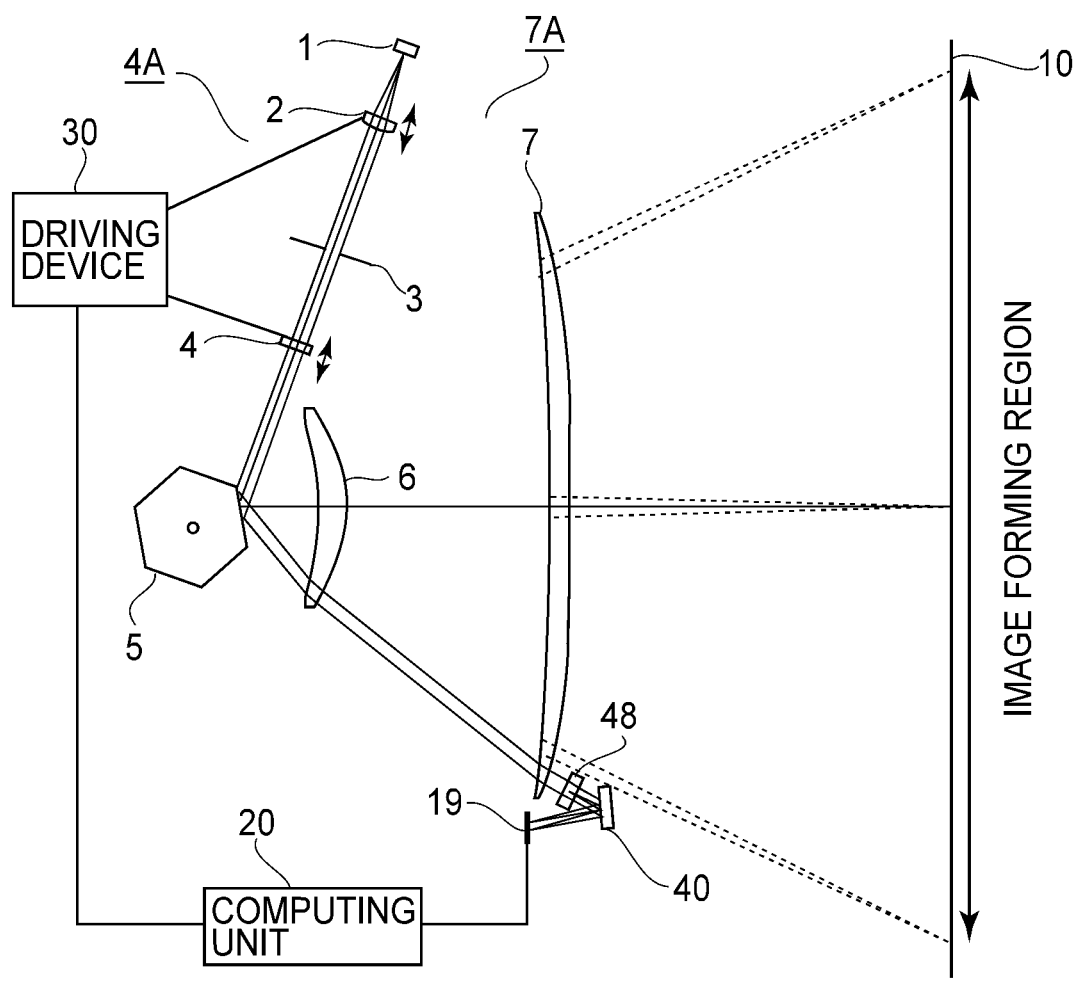
FIG. 22 is a schematic diagram illustrating a fourth embodiment of the present invention.
Figure 23:
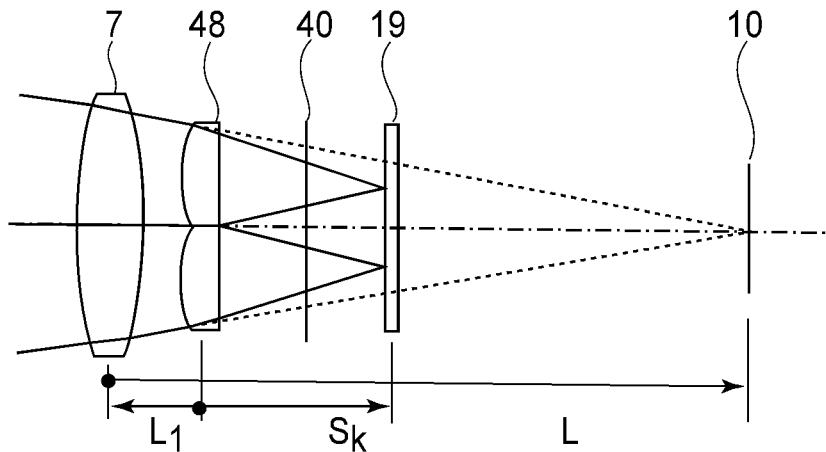
FIG. 23 is a schematic diagram illustrating the positional relationship of a third optical system in an example wherein a deflector member is disposed between pupil dividing means and a photodetecting device of FIG. 22.

FIG. 22 and FIG. 23 are schematic diagrams of a fourth embodiment of the present invention.

More specifically, FIG. 22 is a schematic diagram in the main-scan section of the fourth embodiment of the present invention. FIG. 23 is a schematic diagram illustrating the positional relationship of a third optical system 48 in an example wherein a deflecting member is provided between the pupil dividing means and the photodetecting device of FIG. 22.

In these drawings, denoted at 1 is light source means which comprises a semiconductor laser, for example. Denoted at 2 is a condenser lens (collimator lens) which serves to convert a light beam emitted from the light source means 1 into an approximately parallel light beam (or a divergent light beam or a convergent light beam). Denoted at 3 is an aperture stop which functions to shape the light beam from the condenser lens 2 into an optimum beam profile. Denoted at 4 is a cylindrical lens which has a finite power (refracting power) only in the sub-scan direction (sub-scan section).

The condenser lens 2 and the cylindrical lens 4 constitute a portion of a first optical system 4A. Denoted at 5 is an optical deflector (polygon mirror) as deflecting means. It is rotated at a constant speed in a predetermined direction by driving means such as a motor, not shown.

Denoted at 7A is an imaging optical system as a second optical system. It comprises imaging lenses (anamorphic lenses) 6 and 7 having different powers in the main-scan section and the sub-scan section, respectively. Denoted at 48 is pupil dividing means which comprises, like FIG. 2A, four lens members including two in the main-scan direction and two in the sub-scan direction.

Denoted at 40 is deflecting means as a third optical system which comprises a reflection mirror, for example, for deflecting a light beam from the pupil dividing means 48. Denoted at 19 is a photodetecting device which is disposed at or near the position where the light beam from the pupil dividing means 18 is imaged, or at or near a position which is optically equivalent to that imaging position. The photodetecting device 19 is comprised of, for example, an area sensor having picture elements arranged two-dimensionally in the main-scan direction and the sub-scan direction.

The light collected onto the photodetecting device 19 is electrically converted, and output data is produced with respect to each picture element. Denoted at 20 is an arithmetic unit which operates to detect, using the result prepared by the photodetecting device 19, the light convergence position on the scan surface 10 in accordance with the correlation calculation to be described below. It determines the driving amount for at least one of the condenser lens 2 and the cylindrical lens 4 to shift the light beam from the detected convergence position back to the in-focus position.

Denoted at 30 is a driving device which drives at least one of the condenser lens 2 and the cylindrical lens 4 of the first optical system, based on the result obtained at the arithmetic unit 20.

In this embodiment, the light beam emitted from the light source means 1 is converted into an approximately parallel light beam by the condenser lens 2. Then, the light beam diameter is restricted by a stop 3. Subsequently, the restricted light beam is converted into a convergent light beam in the sub-scan section by means of the cylindrical lens 4, and then the light beam is incident on the deflecting means 5 such as a polygon mirror.

Subsequently, the light beam deflected by the deflecting means 5 goes through the anamorphic lenses 6 and 7, and it scans the scan surface 10 such as a photosensitive drum at a constant speed.

Table 1 shows the characteristics of the second optical system 7A in the present embodiment.

The pupil dividing means 48 which is comprised of four lens members including two in the main-scan direction and two in the sub-scan direction, is disposed at the position where the scanning light outside the image forming region, having passed through the first and second optical systems 4A and 7A, go through and the position which is after the anamorphic lens 6.

The light beam from the pupil dividing means is deflected by the deflecting means 40. The photodetecting device 19 is disposed at or near the position where the light beam from the pupil dividing means 48 is imaged, or at or near a position which is optically equivalent to that imaging position. The photodetecting device 19 is comprised of, for example, an area sensor having picture elements arranged two-dimensionally in the main-scan direction and the sub-scan direction.

Next, the autofocus (AF) detecting unit which is an important feature of the present embodiment will be explained.

In this embodiment, the optical element 7 among the second optical system 7A which is closest to the scan surface 10 is an anamorphic lens. FIG. 23 illustrates the positional relationship of the anamorphic lens 7, pupil dividing means 48, photodetecting device 19 and the scan surface 10.

Here, denoted at $L_1$ is the optical path length from the pupil dividing means 48 to the anamorphic lens 7. Denoted at L is the optical path length from the anamorphic lens 7 to the scan surface 10. Denoted at $s_k$ is the optical path length along which a light ray advances from the pupil dividing means 48 and, while being bent by the reflecting member 40, up to the photodetecting device 19.

If the advancement direction of the light is taken as a positive direction, since in this embodiment the pupil dividing means 48 is disposed after the anamorphic lens 7, there is a relation $L_1<0$. Furthermore, in order that the photodetecting device 19 is located after the pupil dividing means 48 and that the photodetecting device 19 is located before the scan surface 10, a condition $L_1<s_k<L+L_1$ should be satisfied.

In this embodiment, L=159.83 mm, $L_1$=−10.29 mm, and $s_k$=64.23 mm. Thus, expression (6) is satisfied.

The detection signal at the photodetecting device 19 in the present embodiment is similar to that of FIG. 7 and FIG. 8.

FIG. 7 shows a detection signal in the sub-scan direction, and FIG. 8 shows a detection signal in the main-scan direction. The magnitude of the focal shift can be detected by determining the spacing of peaks as depicted by a double-headed arrow in the drawing, in accordance with the correlation calculation.

With regard to the structure of the optical system, if D=b, it is seen from FIG. 4 that δ/D=0.3.

In this embodiment, in a case of an optical system in which a=3.02 mm, L=159.83 mm, $L_1$=−10.29 mm, K=1.64 and λ=670 nm, from expression (12) it follows that the detection resolving power of the focal shift is 1.38 mm.

Furthermore, if D≥b is realized, the detection resolving power of the focal shift can be made not greater than 1.38 mm. Thus, more precise detection is enabled. Hence, in accordance with the required detection resolving power, the sensor pitch and the size of the spot diameter can be determined appropriately.

The AF (autofocus) can be done in a similar method as the first embodiment.

In this embodiment, the pupil dividing means 48 may have shapes such as shown in FIGS. 2A, 2B and 2C. When the example of FIG. 2C is used, the photodetecting device 19 may comprise two line sensors having picture elements arranged one-dimensionally in the main-scan direction or the sub-scan direction.

Furthermore, the pupil dividing means may be bisected as in the second embodiment, with similar advantageous effects.

Furthermore, the correlation calculation of the arithmetic unit 20 may be based on any other method such as one taking the difference with respect to each picture element or one well known in the art.

A cylindrical lens having a power only in the main-scan direction for focus adjustment in the main-scan direction may be incorporated into the first optical system, as an element for controlling the AF (autofocus). In that occasion, when the focal shift in main-scan direction and the sub-scan direction is controlled with these two cylindrical lenses, similar advantageous effects are provided.

Furthermore, the driven direction is not limited to the optical axis direction. The lenses may be moved in the main-scan direction or in the sub-scan direction. Any eccentric movement such as tilt or swinging may be added.

Embodiment of Color Image Forming Apparatus

Figure 24:
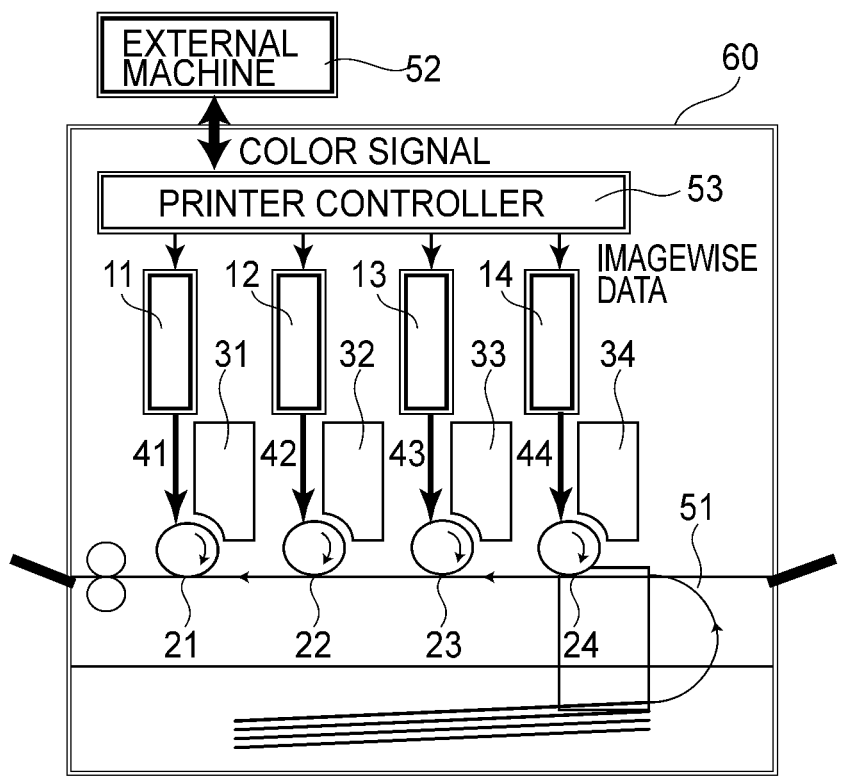
FIG. 24 is a schematic diagram of a main portion of a color image forming apparatus according to an embodiment of the present invention.

FIG. 24 is a schematic view of a main portion of a color image forming apparatus according to an embodiment of the present invention. This embodiment is directed to a tandem type color image forming apparatus in which four scanning optical devices are provided so as to record imagewise data upon the surfaces of corresponding photosensitive drums (image bearing members) in parallel to each other.

FIG. 24, denoted generally at 60 is a color image forming apparatus, and denoted at 11, 12, 13, and 14 are scanning optical devices having a structure according to any one of the preceding embodiments. Denoted at 21, 22, 23, and 24 are photosensitive drums (image bearing members), and denoted at 31, 32, 33 and 34 are developing devices, respectively. Denoted at 51 is a conveyance belt.

In FIG. 24, the color image forming apparatus 60 receives color signals of R (red), G (green) and B (blue) supplied thereto from an outside machine 52 such as a personal computer, for example. These color signals are transformed by means of a printer controller 53 inside the image forming apparatus, into imagewise data (dot data) corresponding to C (cyan), M (magenta), Y (yellow) and B (black).

These imagewise data are inputted into the scanning optical devices 11, 12, 13, and 14, respectively. In response, these optical scanning devices produce light beams 41, 42, 43 and 44 having been modulated in accordance with the associated imagewise data. Through these light beams, the photosensitive surfaces of the photosensitive drums 21, 22, 23, and 24 are scanned in the main-scan direction.

In the color image forming apparatus of this embodiment, four scanning optical devices 11, 12, 13, and 14 are provided and these correspond to colors of C (cyan), M (magenta), Y (yellow) and B (black), respectively. These scanning devices are operable in parallel to each other to record imagewise signals upon the surfaces of the photosensitive drums 21, 22, 23, and 24, respectively, so that a color image can be printed at high speed.

As described, the color image forming apparatus of this embodiment uses four scanning optical devices 11-14 to produce latent images for different colors upon the surfaces of corresponding photosensitive drums 21-24, respectively, by use of light beams based on respective image data. After that, these images are superposedly transferred onto a recording sheet 51, whereby a single full-color image is produced thereon.

As regards the outside machine 52, a color image reading machine having a CCD sensor, for example, may be used. In that occasion, this color image reading machine and the color image forming apparatus 60 will provide a color digital copying machine.

Although preferred embodiments of the present invention have bee described above, the present invention is not limited to them. A wide variety of changes and modifications are possible within the scope of the present invention. Furthermore, the recording density of the image forming apparatus to which the present invention is applicable is not limited to a specified one. However, the higher the recording density is, the higher the required image quality is. Taking this into account, the first to fourth embodiments of the present invention will be more effective for image forming apparatuses having a resolution of 1200 dpi or more.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2008-266281 filed Oct. 15, 2008, which is hereby incorporated by reference herein.

What is claimed is:

1. A scanning optical device comprising:

a light source;

a first optical system configured to collect a light beam emitted from said light source, wherein said first optical system includes at least one movable optical element movable along an optical axis direction;

a deflector configured to scanningly deflect the light beam from said first optical system;

a second optical system configured to guide the light beam scanningly deflected by a deflecting surface of said deflector onto a surface to be scanned to form an image;

a third optical system comprising a plurality lenses, including at least first two lenses aligned along a main-scan direction and at least second two lenses aligned along a sub-scan direction, configured to concurrently divide a same light beam scanningly deflected by the deflecting surface of the deflector and passed through an outside of an effective scan region of the second optical system and incident on the plurality of lenses, into a plurality of light beams with at least first two of the plurality of light beams arranged along the main-scan direction and at least second two of the plurality of light beams arranged along the sub-scan direction;

a detecting device configured to detect the at least first two light beams arranged along the main-scan direction and the at least second two light beams arranged along the sub-scan direction, and detect positional information concerning a spacing in the main-scan direction between imaging positions of the at least first two light beams and a spacing in the sub-scan direction between the imaging positions of the at least second two light beams;

an arithmetic unit configured to determine a focal shift direction and a focal shift amount in the main-scan direction, as well as a focal shift direction and a focal shift amount in the sub-scan direction, on the basis of the positional information detected by said detecting device; and a driving device configured to move, based on the determination made by the arithmetic unit, the movable optical element of said first optical system along the optical axis direction to correct the focal shift in the main-scan direction and the focal shift in the sub-scan direction.

2. A scanning optical device as claimed in claim 1, wherein said second optical system has at least one imaging optical element made of a resin.

3. A scanning optical device as claimed in claim 1, wherein said third optical system is disposed at a position where the beam is dividable before the second optical system forms the image.

4. A scanning optical device comprising:

a light source;

a first optical system configured to collect a light beam emitted from said light source, wherein said first optical system includes at least one movable optical element movable along an optical axis direction;

a deflector configured to scanningly deflect the light beam from said first optical system;

a second optical system configured to guide the light beam scanningly deflected by a deflecting surface of said deflector onto a surface to be scanned to form an image;

a third optical system configured to divide a light beam scanningly deflected by the deflecting surface of said deflector and passed through an outside of an effective scan region of said second optical system, into a plurality of light beams with respect to each of a main-scan direction and a sub-scan direction;

a detecting device configured to detect the plurality of light beams divided by said third optical system in each of the main-scan direction and the sub-scan direction, and detect positional information concerning a spacing in the main-scan direction between imaging positions of a plurality of light beams and a spacing in the sub-scan direction between the imaging positions of the plurality of light beams;

an arithmetic unit configured to determine a focal shift direction and a focal shift amount in the main-scan direction, as well as a focal shift direction and a focal shift amount in the sub-scan direction, on the basis of the positional information detected by said detecting device; and a driving device configured to move, based on the determination made by the arithmetic unit, the movable optical element of said first optical system along the optical axis direction to correct the focal shift in the main-scan direction and the focal shift in the sub-scan direction, wherein said third optical system includes (i) a fourth optical system having optical elements arranged one-dimensionally with respect to the main-scan direction and configured to divide the light beam scanningly deflected by the deflecting surface of said deflector and passed through the outside of the effective scan region of said second optical system, into a plurality of light beams with respect to the main-scan direction, and (ii) a fifth optical system having optical elements arranged one-dimensionally with respect to the sub-scan direction and configured to divide the light beam scanningly deflected by the deflecting surface of said deflector and passed through the outside of the effective scan region of said second optical system, into a plurality of light beams with respect to the sub-scan direction.

5. A scanning optical device comprising:

a light source;

a first optical system configured to collect a light beam emitted from said light source, wherein said first optical system includes at least one movable optical element movable along an optical axis direction;

a deflector configured to scanningly deflect the light beam from said first optical system;

a second optical system configured to guide the light beam scanningly deflected by a deflecting surface of said deflector onto a surface to be scanned to form an image;

a third optical system configured to divide a light beam scanningly deflected by the deflecting surface of said deflector and passed through an outside of an effective scan region of said second optical system, into a plurality of light beams with respect to each of a main-scan direction and a sub-scan direction;

a detecting device configured to detect the plurality of light beams divided by said third optical system in each of the main-scan direction and the sub-scan direction, and detect positional information concerning a spacing in the main-scan direction between imaging positions of a plurality of light beams and a spacing in the sub-scan direction between the imaging positions of the plurality of light beams;

an arithmetic unit configured to determine a focal shift direction and a focal shift amount in the main-scan direction, as well as a focal shift direction and a focal shift amount in the sub-scan direction, on the basis of the positional information detected by said detecting device; and a driving device configured to move, based on the determination made by the arithmetic unit, the movable optical element of said first optical system along the optical axis direction to correct the focal shift in the main-scan direction and the focal shift in the sub-scan direction, wherein, when an optical path length from said third optical system to an optical element of said second optical system which element is closest to the surface to be scanned is denoted by $L_1$ (mm), an optical path length from the optical element of said second optical system, closest to the surface to be scanned, up to the surface to be scanned is denoted by L (mm), and an optical path length from said third optical system to said detecting device is denoted by $s_k$ (mm), a relation $$L_1 < s_k < L + L_1$$

is satisfied.

6. A scanning optical device comprising:
a light source;
a first optical system configured to collect a light beam emitted from said light source, wherein said first optical system includes at least one movable optical element movable along an optical axis direction;
a deflector configured to scanningly deflect the light beam from said first optical system;
a second optical system configured to guide the light beam scanningly deflected by a deflecting surface of said deflector onto a surface to be scanned to form an image;
a third optical system configured to divide a light beam scanningly deflected by the deflecting surface of said deflector and passed through an outside of an effective scan region of said second optical system, into a plurality of light beams with respect to each of a main-scan direction and a sub-scan direction;
a detecting device configured to detect the plurality of light beams divided by said third optical system in each of the main-scan direction and the sub-scan direction, and detect positional information concerning a spacing in the main-scan direction between imaging positions of a plurality of light beams and a spacing in the sub-scan direction between the imaging positions of the plurality of light beams;
an arithmetic unit configured to determine a focal shift direction and a focal shift amount in the main-scan direction, as well as a focal shift direction and a focal shift amount in the sub-scan direction, on the basis of the positional information detected by said detecting device; and
a driving device configured to move, based on the determination made by the arithmetic unit, the movable optical element of said first optical system along the optical axis direction to correct the focal shift in the main-scan direction and the focal shift in the sub-scan direction, wherein, when a width of one picture element of said detecting device in one of the main-scan direction or the sub-scan direction is denoted by b (mm), and a width of a spot of a light beam imaged on said detecting device with respect to a picture element array direction is denoted by D (mm), a relation $$D \geq b$$

is satisfied, where the width D is the size as sliced by $1/e^2$ of a peak light quantity of a beam intensity distribution.

7. An image forming apparatus comprising:
a scanning optical device comprising:
a light source;
a first optical system configured to collect a light beam emitted from said light source, wherein said first optical system includes at least one movable optical element movable along an optical axis direction;
a deflector configured to scanningly deflect the light beam from said first optical system;
a second optical system configured to guide the light beam scanningly deflected by a deflecting surface of said deflector onto a surface to be scanned to form an image;
a third optical system comprising a plurality lenses, including at least first two lenses aligned along a main-scan direction and at least second two lenses aligned along a sub-scan direction, configured to concurrently divide a same light beam scanningly deflected by the deflecting surface of the deflector and passed through an outside of an effective scan region of the second optical system and incident on the plurality of lenses, into a plurality of light beams with at least first two of the plurality of light beams arranged along the main-scan direction and at least second two of the plurality of light beams arranged along the sub-scan direction;
a detecting device configured to detect the at least first two light beams arranged along the main-scan direction and the at least second two light beams arranged along the sub-scan direction, and detect positional information concerning a spacing in the main-scan direction between imaging positions of the at least first two light beams and a spacing in the sub-scan direction between the imaging positions of the at least second two light beams;
an arithmetic unit configured to determine a focal shift direction and a focal shift amount in the main-scan direction, as well as a focal shift direction and a focal shift amount in the sub-scan direction, on the basis of the positional information detected by said detecting device; and
a driving device configured to move, based on the determination made by the arithmetic unit, the movable optical element of said first optical system along the optical axis direction to correct the focal shift in the main-scan direction and the focal shift in the sub-scan direction;
a developing device for developing an electrostatic latent image into a toner image, the electrostatic latent image being formed on a photosensitive member disposed at the surface to be scanned with the light beam scanningly deflected by said scanning optical device;
a transferring device for transferring the developed toner image onto a transfer material; and
a fixing device for fixing the transferred toner image, on the transfer material.

8. An image forming apparatus as claimed in claim 7, further comprising a printer controller for converting code data supplied from an outside machine into an imagewise signal and for inputting the imagewise signal into said optical scanning device.

9. A scanning optical device comprising:
a light source;
a first optical system configured to collect a light beam emitted from said light source;
a deflector configured to scanningly deflect the light beam from said first optical system;
a second optical system having at least one imaging optical element made of a resin and configured to image the light beam scanningly deflected by a deflecting surface of said deflector onto a surface to be scanned;

a third optical system configured to divide a light beam scanningly deflected by the deflecting surface of said deflector and passed through an outside of an effective scan region of said second optical system, into a plurality of light beams with respect to each of a main-scan direction and a sub-scan direction; and a detecting device configured to detect the plurality of light beams divided by said third optical system in each of the main-scan direction and the sub-scan direction, wherein, on the basis of positional information concerning a spacing in the main-scan direction between imaging positions of a plurality of light beams and a spacing between the imaging positions in the sub-scan direction of the plurality of light beams as detected by said detecting device, a focal shift direction and a focal shift amount in the main-scan direction as well as a focal shift direction and a focal shift amount in the sub-scan direction are determined, and wherein an optical element of said first optical system is moved in an optical axis direction based on the determination, to correct the focal shift in the main-scan direction and the focal shift in the sub-scan direction, wherein said third optical system includes (i) a fourth optical system having optical elements arranged one-dimensionally with respect to the main-scan direction and configured to divide the light beam scanningly deflected by the deflecting surface of said deflector and passed through the outside of the effective scan region of said second optical system, into a plurality of light beams with respect to the main-scan direction, and (ii) a fifth optical system having optical elements arranged one-dimensionally with respect to the sub-scan direction and configured to divide the light beam scanningly deflected by the deflecting surface of said deflector and passed through the outside of the effective scan region of said second optical system, into a plurality of light beams with respect to the sub-scan direction.

10. A scanning optical device comprising:

a light source;

a first optical system configured to collect a light beam emitted from said light source;

a deflector configured to scanningly deflect the light beam from said first optical system;

a second optical system having at least one imaging optical element made of a resin and configured to image the light beam scanningly deflected by a deflecting surface of said deflector onto a surface to be scanned;

a third optical system configured to divide a light beam scanningly deflected by the deflecting surface of said deflector and passed through an outside of an effective scan region of said second optical system, into a plurality of light beams with respect to each of a main-scan direction and a sub-scan direction; and a detecting device configured to detect the plurality of light beams divided by said third optical system in each of the main-scan direction and the sub-scan direction, wherein, on the basis of positional information concerning a spacing in the main-scan direction between imaging positions of a plurality of light beams and a spacing between the imaging positions in the sub-scan direction of the plurality of light beams as detected by said detecting device, a focal shift direction and a focal shift amount in the main-scan direction as well as a focal shift direction and a focal shift amount in the sub-scan direction are determined, and wherein an optical element of said first optical system is moved in an optical axis direction based on the determination, to correct the focal shift in the main-scan direction and the focal shift in the sub-scan direction, wherein, when an optical path length from said third optical system to an optical element of said second optical system which element is closest to the surface to be scanned is denoted by L1 (mm), an optical path length from the optical element of said second optical system, closest to the surface to be scanned, up to the surface to be scanned is denoted by L (mm), and an optical path length from said third optical system to said detecting device is denoted by sk (mm), a relation $$L1 < sk < L + L1$$

is satisfied.

11. A scanning optical device comprising:

a light source;

a first optical system configured to collect a light beam emitted from said light source;

a deflector configured to scanningly deflect the light beam from said first optical system;

a second optical system having at least one imaging optical element made of a resin and configured to image the light beam scanningly deflected by a deflecting surface of said deflector onto a surface to be scanned;

a third optical system configured to divide a light beam scanningly deflected by the deflecting surface of said deflector and passed through an outside of an effective scan region of said second optical system, into a plurality of light beams with respect to each of a main-scan direction and a sub-scan direction; and a detecting device configured to detect the plurality of light beams divided by said third optical system in each of the main-scan direction and the sub-scan direction, wherein, on the basis of positional information concerning a spacing in the main-scan direction between imaging positions of a plurality of light beams and a spacing between the imaging positions in the sub-scan direction of the plurality of light beams as detected by said detecting device, a focal shift direction and a focal shift amount in the main-scan direction as well as a focal shift direction and a focal shift amount in the sub-scan direction are determined, and wherein an optical element of said first optical system is moved in an optical axis direction based on the determination, to correct the focal shift in the main-scan direction and the focal shift in the sub-scan direction, wherein, when a width of one picture element of said detecting device in one of the main-scan direction or the sub-scan direction is denoted by b (mm), and a width of a spot of a light beam imaged on said detecting device with respect to a picture element array direction is denoted by D (mm), a relation $$D \geq b$$

is satisfied, where the width D is the size as sliced by 1/e2 of a peak light quantity of a beam intensity distribution.

* * * * *